(12) United States Patent
Ikeuchi et al.

(10) Patent No.: US 10,950,879 B2
(45) Date of Patent: Mar. 16, 2021

(54) REDOX FLOW BATTERY

(71) Applicant: Sumitomo Electric Industries, Ltd., Osaka (JP)

(72) Inventors: Atsuo Ikeuchi, Osaka (JP); Kiyoaki Hayashi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 95 days.

(21) Appl. No.: 16/067,190

(22) PCT Filed: Nov. 2, 2017

(86) PCT No.: PCT/JP2017/039813
§ 371 (c)(1),
(2) Date: Jun. 29, 2018

(87) PCT Pub. No.: WO2019/087366
PCT Pub. Date: May 9, 2019

(65) Prior Publication Data
US 2019/0237781 A1    Aug. 1, 2019

(51) Int. Cl.
*H01M 8/04186*    (2016.01)
*H01M 8/04746*    (2016.01)
*H01M 8/04082*    (2016.01)
*H01M 8/18*    (2006.01)

(52) U.S. Cl.
CPC ... *H01M 8/04186* (2013.01); *H01M 8/04201* (2013.01); *H01M 8/04753* (2013.01); *H01M 8/188* (2013.01)

(58) Field of Classification Search
CPC combination set(s) only.
See application file for complete search history.

(56) References Cited

U.S. PATENT DOCUMENTS

| | | | |
|---|---|---|---|
| 6,475,661 B1 * | 11/2002 | Pellegri | H01M 2/40 429/105 |
| 2008/0241643 A1 * | 10/2008 | Lepp | H01M 8/04753 429/61 |
| 2016/0006051 A1 | 1/2016 | Winter et al. | |

FOREIGN PATENT DOCUMENTS

| | | |
|---|---|---|
| JP | 2005-243326 A | 9/2005 |
| JP | 2012-099368 A | 5/2012 |
| JP | 2015-032356 A | 2/2015 |
| JP | 2015-065157 A | 4/2015 |
| WO | 2015/029941 A1 | 3/2015 |
| WO | 2017/006232 A1 | 1/2017 |

* cited by examiner

*Primary Examiner* — Ula C Ruddock
*Assistant Examiner* — Sarika Gupta
(74) *Attorney, Agent, or Firm* — Baker Botts L.L.P.; Michael A. Sartori

(57) ABSTRACT

A redox flow battery includes a positive electrolyte tank container which houses a positive electrolyte tank for storing a positive electrolyte; a negative electrolyte tank container which houses a negative electrolyte tank for storing a negative electrolyte; and a battery container which houses a battery cell including a positive electrode, a negative electrode, and a membrane, a positive electrolyte circulation mechanism configured to supply and circulate the positive electrolyte to the battery cell, and a negative electrolyte circulation mechanism configured to supply and circulate the negative electrolyte to the battery cell.

13 Claims, 15 Drawing Sheets

REDOX FLOW BATTERY

TECHNICAL FIELD

The present invention relates to a redox flow battery.

BACKGROUND ART

Redox flow batteries (RF batteries) are known as one of large-capacity storage batteries that store power derived from natural energy obtained by solar power generation, wind power generation, or the like. An RF battery includes a cell stack having a plurality of battery cells, positive and negative electrolyte tanks for storing positive and negative electrolytes, supply pipes for supplying the positive and negative electrolytes to the battery cells, discharge pipes for discharging the positive and negative electrolytes from the battery cells, and pumps for circulating the positive and negative electrolytes (Patent Literature 1).

CITATION LIST

Patent Literature

PTL 1: Japanese Unexamined Patent Application Publication No. 2012-099368

SUMMARY OF INVENTION

A redox flow battery according to the present disclosure includes a positive electrolyte tank container which houses a positive electrolyte tank for storing a positive electrolyte; a negative electrolyte tank container which houses a negative electrolyte tank for storing a negative electrolyte; and a battery container which houses a battery cell including a positive electrode, a negative electrode, and a membrane, a positive electrolyte circulation mechanism configured to supply and circulate the positive electrolyte to the battery cell, and a negative electrolyte circulation mechanism configured to supply and circulate the negative electrolyte to the battery cell.

DESCRIPTION OF EMBODIMENTS

Figure 1:
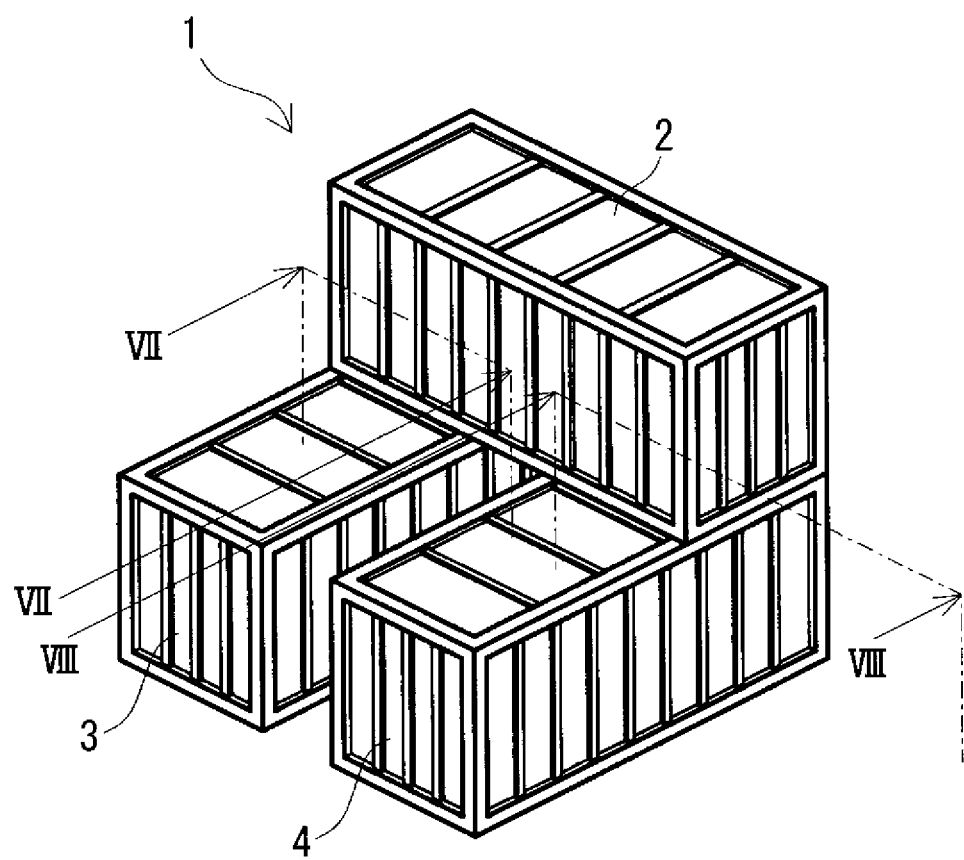
FIG. 1 is a schematic perspective view of a cross-stacking type redox flow battery according to an embodiment.

Problems to be Solved by the Present Disclosure

A redox flow battery (RF battery) is assembled, usually, at its installation location, by connecting a cell stack to positive and negative electrolyte tanks, pipes, and the like. Sufficient working space cannot always be secured at the installation location, and the assembly operation may become complicated in some cases. Accordingly, it has been studied to use a procedure in which an RF battery is assembled inside a case (e.g., a container) that can house the RF battery as a whole and the case including the RF battery is transported to the installation location. However, when changes in design of battery capacity, battery output, and the like occur after installation, since the RF battery is housed as a whole in one case, due to being restricted by the capacity of the case, it is difficult to exchange for an electrolyte tank with a larger capacity or a cell stack having a larger number of cells.

Accordingly, it is an object to provide a redox flow battery in which changes in design of battery capacity and battery output can be easily made.

Advantageous Effects of the Present Disclosure

According to the present disclosure, changes in design of battery capacity and battery output can be easily made.

Description of Embodiments of the Present Invention

First, the embodiments of the present invention will be enumerated and described.

(1) A redox flow battery according to an aspect of the present invention includes a positive electrolyte tank container which houses a positive electrolyte tank for storing a positive electrolyte; a negative electrolyte tank container which houses a negative electrolyte tank for storing a negative electrolyte; and a battery container which houses a battery cell including a positive electrode, a negative electrode, and a membrane, a positive electrolyte circulation mechanism configured to supply and circulate the positive electrolyte to the battery cell, and a negative electrolyte circulation mechanism configured to supply and circulate the negative electrolyte to the battery cell.

In the configuration described above, changes in design of battery capacity, battery output, and the like can be easily made. The reason for this is that the battery cell and others, the positive electrolyte tank, and the negative electrolyte tank are housed in different containers. The containers themselves can be exchanged easily, and members (the battery cell and electrolyte tanks) requiring changes in design can be exchanged by exchanging the containers themselves housing the corresponding members. When the tank containers and the battery container themselves are exchanged for containers having different sizes, the amounts of electrolytes and the number of battery cells housed inside can be changed, and the battery capacity and battery output of the RF battery can be changed. Although details will be described later, for example, in the case where the battery capacity is increased (decreased), the two tank containers may be exchanged for larger (smaller) tank containers; and in the case where the battery output is increased (decreased), the battery container may be exchanged for a larger (smaller) battery container.

(2) In an embodiment of the redox flow battery, the positive electrolyte circulation mechanism includes a positive electrolyte supply pipe for supplying the positive electrolyte to the battery cell and a positive electrolyte discharge pipe for discharging the positive electrolyte from the battery cell, and the negative electrolyte circulation mechanism includes a negative electrolyte supply pipe for supplying the negative electrolyte to the battery cell and a negative electrolyte discharge pipe for discharging the negative electrolyte from the battery cell; the positive electrolyte tank includes a positive electrolyte outgoing pipe for sending the positive electrolyte from the positive electrolyte tank to the positive electrolyte supply pipe and a positive electrolyte return pipe for returning the positive electrolyte from the positive electrolyte discharge pipe to the positive electrolyte tank, and the negative electrolyte tank includes a negative electrolyte outgoing pipe for sending the negative electrolyte from the negative electrolyte tank to the negative electrolyte supply pipe and a negative electrolyte return pipe for returning the negative electrolyte from the negative electrolyte discharge pipe to the negative electrolyte tank; and the redox flow battery further includes connection structures which connect, in a detachable manner, the positive electrolyte supply pipe, the negative electrolyte supply pipe, the positive electrolyte discharge pipe, and the negative electrolyte discharge pipe to the positive electrolyte outgoing pipe, the negative electrolyte outgoing pipe, the positive electrolyte return pipe, and the negative electrolyte return pipe, respectively.

In the configuration described above, changes in design of battery capacity, battery output, and the like can be easily made. The reason for this is that when the containers themselves are exchanged due to occurrence of changes in design of battery capacity, battery output, and the like, the pipes can be easily detached. Usually, electrolyte flow pipes are connected to each other by using an adhesive, fusion bonding, or the like so as not to be detached from each other. Thus, once the flow pipes are connected to each other, the detaching operation for the pipes is likely to be very complicated.

(3) In an embodiment of the redox flow battery, the battery container is placed on the roof of at least one of the positive electrolyte tank container and the negative electrolyte tank container.

In the configuration described above, by arranging the containers so as to be at least partially stacked on each other, the installation area of the redox flow battery can be decreased.

Furthermore, in comparison with the case where the three containers, i.e., the positive electrolyte tank container, the negative electrolyte tank container, and the battery container, are arranged on the same plane with a distance therebetween, the contact area A among the containers can be increased. Therefore, compared with the total surface area Sa of the three containers (the sum of the surface areas of the individual containers) when the three containers are arranged on the same plane with a distance therebetween, the total surface area Sb of the three containers when the battery container is placed on the roof of at least one of the positive electrolyte tank container and the negative electrolyte tank container can be decreased by the contact area A. The total surface area Sb can be determined from the formula "the total surface area Sa−the contact area A". Therefore, the surface area reduction rate Sc (%) determined by the formula "{1−(total surface area Sb)/(total surface area Sa)}×100" can be easily increased. Thereby, it is possible to reduce the volume of a heat insulating material that is used to cover exposed portions of the outer peripheries of the individual tank containers in order to suppress changes in temperature of electrolytes due to the external environment, and the operation of covering with the heat insulating material can be simplified, resulting in reduction in costs.

Furthermore, by placing the tank containers which are relatively heavy on the lower side and placing the battery container which is relatively light thereon, the center of gravity is lower compared with the case where the containers are stacked by reversing the upper and lower containers. Therefore, the RF battery can be stably installed even when the containers are stacked. In addition, deformation of the containers on the lower side can be suppressed.

(4) In an embodiment of the redox flow battery according to item (3), the battery container extends over and between the positive electrolyte tank container and the negative electrolyte tank container and is placed evenly on the roofs of the positive electrolyte tank container and the negative electrolyte tank container.

In the configuration described above, since the battery container is placed evenly on the roofs of the two tank containers, the battery container can be stably placed.

(5) In an embodiment of the redox flow battery according to item (4), the positive electrolyte tank container and the negative electrolyte tank container are arranged in parallel with a distance therebetween such that the longitudinal directions thereof are parallel to each other, and the battery container is placed such that the longitudinal direction thereof is orthogonal to the longitudinal directions of the positive electrolyte tank container and the negative electrolyte tank container.

In the configuration described above, since the contact area A among the three containers is easily increased, the total surface area Sb is easily decreased, and the surface area reduction rate Sc is easily increased.

(6) In an embodiment of the redox flow battery according to item (4), the positive electrolyte tank container and the negative electrolyte tank container are arranged in parallel such that the longitudinal directions thereof are parallel to each other, and the side surfaces thereof are in contact with each other, and the battery container is placed such that the longitudinal direction thereof is parallel to the longitudinal directions of the positive electrolyte tank container and the negative electrolyte tank container.

In the configuration described above, in comparison with the redox flow battery according to item (5), the contact area A among the three containers is easily increased. Therefore, the total surface area Sb is easily decreased, and the surface area reduction rate Sc is easily increased. By bringing the side surfaces of the two tank containers into contact with each other, the contact area A among the three containers can be increased compared with the redox flow battery according to item (5) in which the two tank containers are arranged with a distance therebetween. In addition, since the side surfaces of the two tank containers are in contact with each other, and the battery container is placed such that the longitudinal direction thereof is parallel to the longitudinal directions of the two tank containers, the bottom of the battery container can be entirely brought into contact with the two tank containers. Therefore, the contact area A among the three containers can be increased compared with the redox flow battery according to item (5) in which the bottom of the battery container is only partially brought into contact with the two tank containers.

(7) In an embodiment of the redox flow battery according to any one of items (4) to (6), the positive electrolyte circulation mechanism and the negative electrolyte circulation mechanism include a positive electrolyte pump and a negative electrolyte pump for circulating the positive electrolyte and the negative electrolyte, respectively, and when the inside of the battery container is viewed in side view, the positive electrolyte pump and the negative electrolyte pump are arranged at positions that are symmetrical with respect to the center, in the left-right direction, of the battery container.

In the configuration described above, since the internal members of the battery container are housed evenly on left and right sides, it is easy to suppress deviation of the center of gravity of the battery container.

Detailed Description of Embodiments of the Present Invention

Details of a redox flow (RF) battery according to an embodiment of the present invention will be described below with reference to the drawings. In the drawings, the same reference signs denote the same components. An RF battery according to the embodiment is typically connected, through an alternating current/direct current converter, between a power generation unit (such as a solar power generation apparatus, wind power generation apparatus, or general power plant) and a load (such as a consumer), charges and stores power generated by the power generation unit, and discharges and supplies stored power to the load. The charge and discharge are performed by using an electrolyte containing, as an active material, metal ions (e.g., vanadium ions, titanium ions, manganese ions, and the like) whose valence is changed by oxidation-reduction as each of a positive electrolyte and a negative electrolyte, and by using the difference between the oxidation-reduction potential of ions contained in the positive electrolyte and the oxidation-reduction potential of ions contained in the negative electrolyte.

<<RF Battery>>

An RF battery 1 according to the embodiment will be described with reference to FIGS. 1 to 11. The RF battery 1 includes a battery cell 200 (FIGS. 10 and 11), a positive electrolyte tank 30 (FIG. 9), a negative electrolyte tank 40, a positive electrolyte circulation mechanism 230, a negative electrolyte circulation mechanism 240, and a control unit 260. The positive and negative electrolyte tanks 30 and 40 store positive and negative electrolytes. The positive and negative electrolyte circulation mechanisms 230 and 240 supply and circulate the positive and negative electrolytes to the battery cell 200. The control unit 260 controls the circulation of the positive and negative electrolytes in the positive and negative electrolyte circulation mechanisms 230 and 240. One of the characteristics of the RF battery 1 is that it includes a battery container 2 which houses the battery cell 200, the positive and negative electrolyte circulation mechanisms 230 and 240, and the control unit 260, a positive electrolyte tank container 3 which houses the positive electrolyte tank 30, and a negative electrolyte tank container 4 which houses the negative electrolyte tank 40, the three containers 2, 3, and 4 containing different members (FIGS. 1 to 6, FIG. 9). Details will be described below. In FIGS. 7 to 11, black arrows indicate flow of electrolytes.

[Battery Container and Positive and Negative Electrolyte Tank Containers]

As described above, the battery container 2 houses the battery cell 200, the positive and negative electrolyte circulation mechanisms 230 and 240, and the control unit 260. Details of the members housed inside the battery container 2 will be described later. The positive electrolyte tank container 3 houses the positive electrolyte tank 30, and the negative electrolyte tank container 4 houses the negative electrolyte tank 40. The battery container 2, the positive electrolyte tank container 3, and the negative electrolyte tank container 4 contain different members. Therefore, changes in design of battery capacity, battery output, and the like can be easily made. The reason for this is that the battery cell 200 and others, the positive electrolyte tank 30, and the negative electrolyte tank 40 are housed in different containers. Accordingly, although details will be described later, by exchanging the battery container 2 and the tank containers 3 and 4 themselves for containers having different sizes, the battery capacity and battery output of the RF battery 1 can be changed. The containers themselves can be exchanged easily, and members (the battery cell 200 and the positive and negative electrolyte tanks 30 and 40) requiring changes in design can be exchanged by exchanging the containers themselves that house the corresponding members.

[Overview of Containers]

The type of each of the containers 2, 3, and 4 is typically a dry container. The shape of each of the containers 2, 3, and 4 is typically rectangular parallelepiped. The containers 2, 3, and 4 each include a rectangular bottom which is installed on an intended installation place, a rectangular top which is arranged so as to face the bottom, two side walls which connect the long sides of the bottom to the long sides of the top, and two end walls which connect the short sides of the bottom to the short sides of and the top. The side walls and the end walls are provided with openable/closable doors so that the worker can access the inside of the container (not shown). The containers 2, 3, and 4 are each, for example, made of steel (such as rolled general structural steel SS400).

The size of each of the containers 2, 3, and 4 can be appropriately selected depending on the battery capacity, battery output, or the like of the RF battery 1. For example, in the case of a large- (small-) capacity RF battery 1, large (small) tank containers 3 and 4 may be selected, and in the case of a high (low) output RF battery 1, a large (small) battery container 2 may be selected. In such a manner, the amounts of positive and negative electrolytes and the number of battery cells that can be housed in the containers 2, 3, and 4 can be increased (decreased). An ocean freight container in accordance with ISO standards (e.g., ISO 1496-1: 2013) is usable as each of the containers 2, 3, and 4. Typical examples of the container that can be used as each of the containers 2, 3, and 4 include a 20 ft container, a 40 ft container, and a 45 ft container, and also include taller containers, such as a 20 ft high cube container, a 40 ft high cube container, and a 45 ft high cube container.

Figure 2:
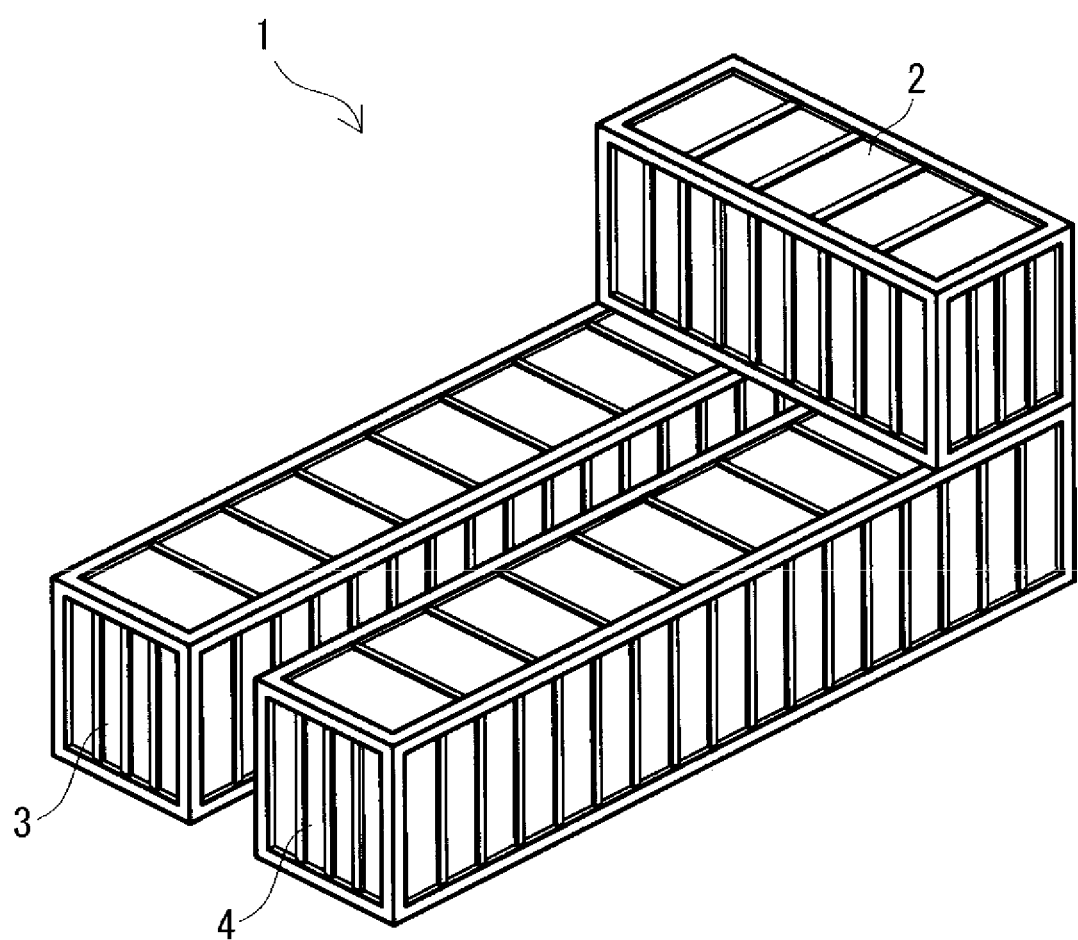
FIG. 2 is a schematic perspective view of another example of a cross-stacking type redox flow battery according to the embodiment.
Figure 3:
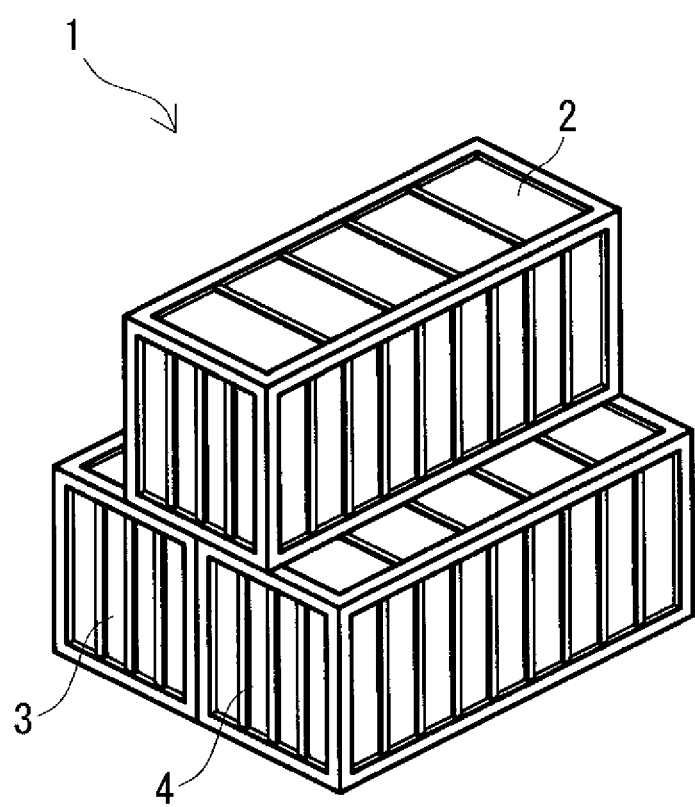
FIG. 3 is a schematic perspective view of a parallel-stacking type redox flow battery according to the embodiment.
Figure 4:
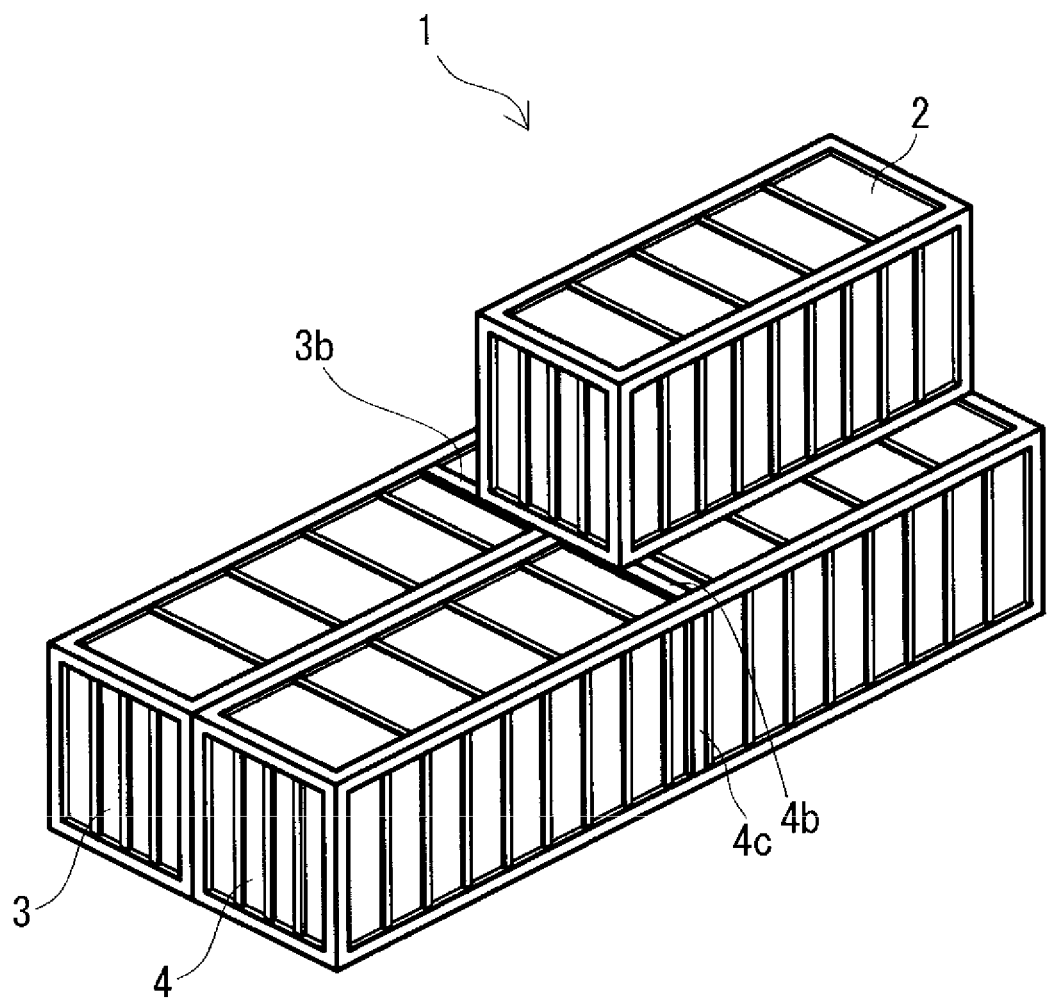
FIG. 4 is a schematic perspective view of another example of a parallel-stacking type redox flow battery according to the embodiment.
Figure 5:
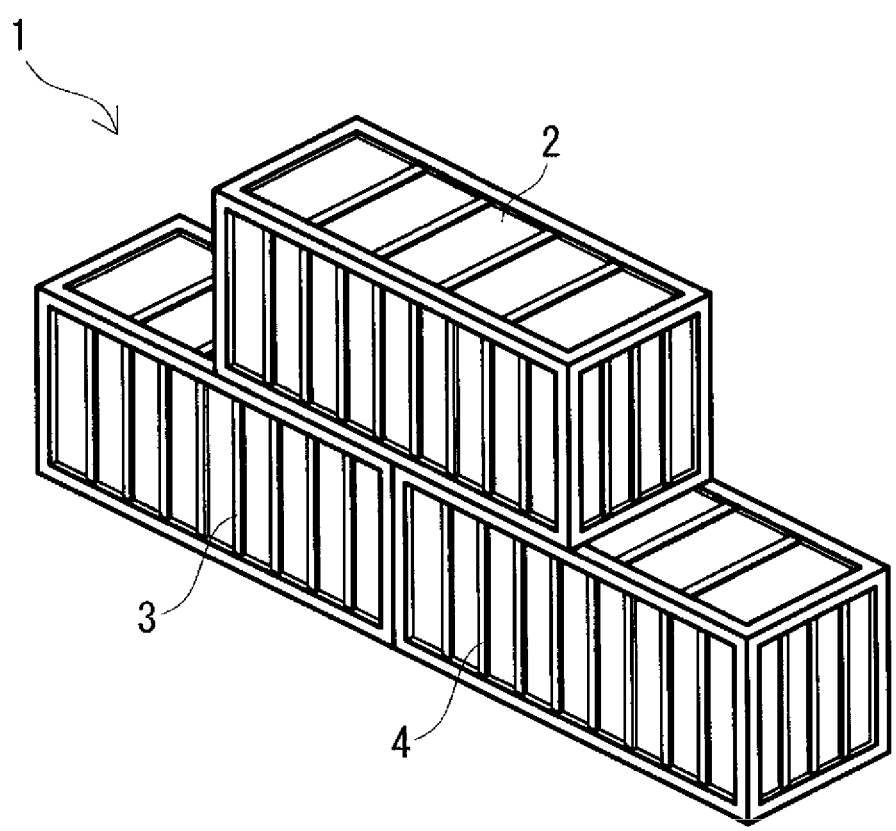
FIG. 5 is a schematic perspective view of a collinear-stacking type redox flow battery according to the embodiment.
Figure 6:
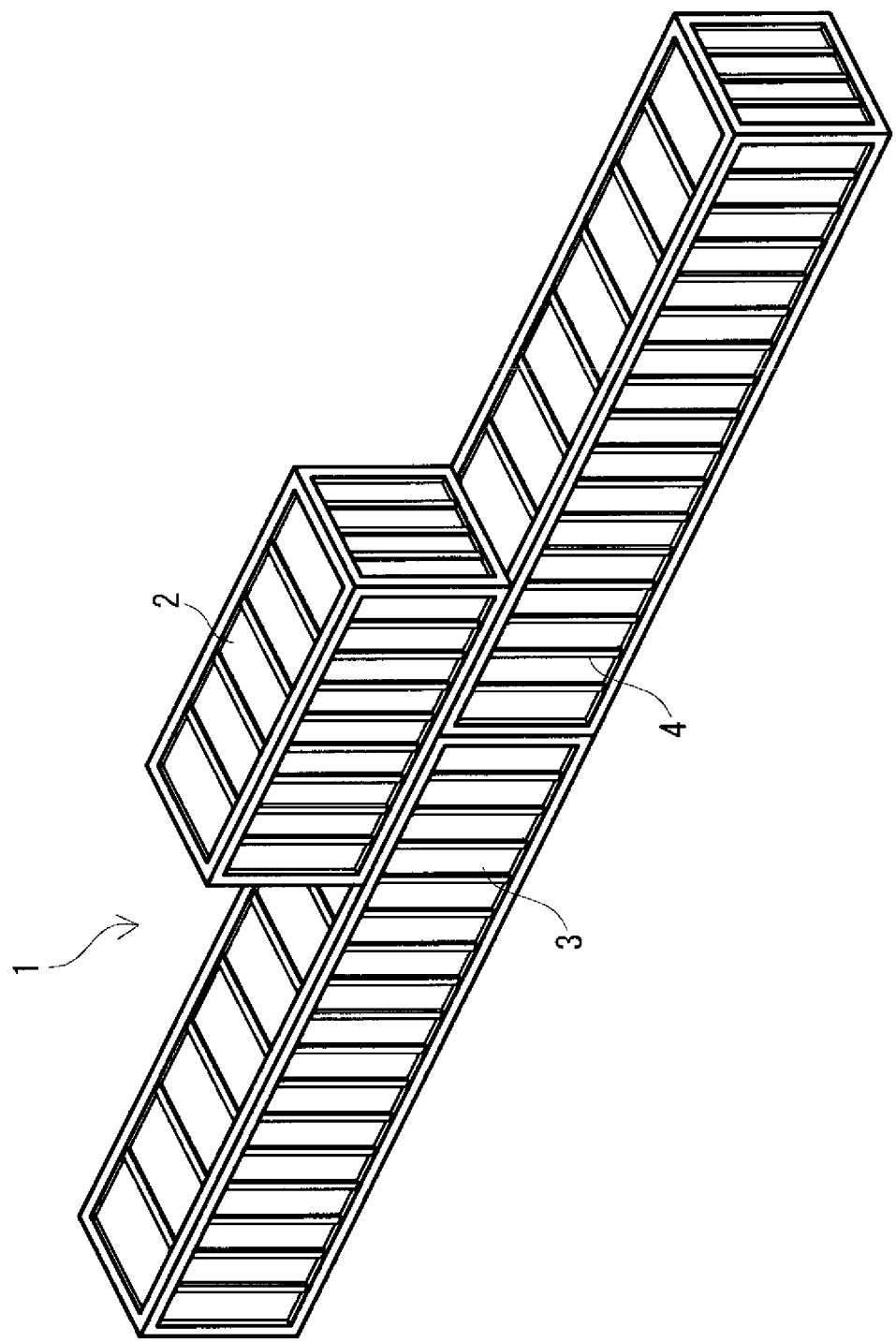
FIG. 6 is a schematic perspective view of another example of a collinear-stacking type redox flow battery according to the embodiment.

Regarding the size of the containers 2, 3, and 4, for example, as shown in FIGS. 1, 3, and 5, the three containers 2, 3, and 4 may have the same size. Furthermore, as shown in FIGS. 2, 4, and 6, the battery container 2 and the two tank containers 3 and 4 may have different sizes by increasing the size of the two tank containers 3 and 4 compared with the size of the two containers 3 and 4 shown in FIGS. 1, 3, and 5. In the case where the battery container 2 and the two tank containers 3 and 4 have different sizes, as shown in FIGS. 2, 4, and 6, as the battery container 2, a container smaller than the two tank containers 3 and 4 can be used.

[Arrangement of Three Containers]

The three containers 2, 3, and 4 may be arranged on the same plane, or as shown in FIGS. 1 to 6, the containers may arranged so as to be stacked in two levels in the vertical direction. By stacking the containers on each other, the installation area of the RF battery 1 can be decreased. Furthermore, in comparison with the case where the three containers 2, 3, and 4 are arranged on the same plane with a distance therebetween (hereinafter, may be referred to as "non-stacking type"), the contact area A among the containers can be increased. Therefore, compared with the total surface area Sa of the three containers 2, 3, and 4 (the sum of the surface areas of the containers 2, 3, and 4) in the non-stacking type, the total surface area Sb of the three containers 2, 3, and 4 when the containers are stacked on each other can be decreased by the contact area A. The total surface area Sb can be determined from the formula "the total surface area Sa–the contact area A". Therefore, the surface area reduction rate Sc (%) determined by the formula "$\{1-(\text{total surface area Sb})/(\text{total surface area Sa})\} \times 100$" can be easily increased. Thereby, it is possible to reduce the volume of a heat insulating material that is used to cover exposed portions of the outer peripheries of the tank containers 3 and 4 in order to suppress changes in temperature of electrolytes due to the external environment, and the operation of covering with the heat insulating material can be simplified, resulting in reduction in costs.

In the case where three containers 2, 3, and 4 are stacked, preferably, the containers are stacked in two levels, two tank containers 3 and 4 are arranged on the lower side, and a battery container 2 is placed on the upper side so as to overlap with the roof of at least one of the positive electrolyte tank container 3 and the negative electrolyte tank container 4. In such a manner, by placing the tank containers 3 and 4 which are relatively heavy on the lower side and placing the battery container 2 which is relatively light thereon, the center of gravity is lower compared with the case where the containers are stacked by reversing the upper and lower containers. Therefore, the RF battery 1 can be stably installed even when the containers 2, 3, and 4 are stacked. In addition, deformation of the containers (tank containers 3 and 4) on the lower side can be suppressed.

Preferably, the battery container 2 on the upper side extends over and between the positive electrolyte tank container 3 and the negative electrolyte tank container 4 on the lower side and is placed evenly on the roofs of the positive electrolyte tank container 3 and the negative electrolyte tank container 4. The expression "being placed evenly on" means that when the RF battery 1 is viewed from the top, the overlapping area between the battery container 2 and the positive electrolyte tank container 3 is substantially the same as the overlapping area between the battery container 2 and the negative electrolyte tank container 4. Thereby, the battery container 2 can be stably placed on the roofs of the two tank containers 3 and 4. The way of stacking the containers 2, 3, and 4 can be appropriately selected depending on the installation place and the like of the RF battery 1, and examples thereof include cross-stacking type (FIGS. 1 and 2), parallel-stacking type (FIGS. 3 and 4), and collinear-stacking type (FIGS. 5 and 6).

(Cross-Stacking Type)

In the cross-stacking type, as shown in FIGS. 1 and 2, two tank containers 3 and 4 are arranged in parallel left to right such that the longitudinal directions thereof are parallel to each other, and a battery container 2 is placed on the roofs of the two tank containers 3 and 4 such that the longitudinal direction of the battery container 2 crosses (orthogonally, in this example) with the longitudinal directions of the tank containers 3 and 4. Although details will be described later, in the cross-stacking type, since the contact area A among the three containers is easily increased compared with the non-stacking type, the total surface area Sb is easily decreased, and the surface area reduction rate Sc is easily increased. In this type, the side surfaces of the two tank containers 3 and 4 face each other.

Preferably, the two tank containers 3 and 4 on the lower side are arranged with a predetermined distance between the side surfaces that face each other. The predetermined distance is, for example, a distance at which the battery container 2 placed on the roofs of the two tank containers 3 and 4 does not protrude outward in the parallel direction of the two tank containers 3 and 4. In particular, when the RF battery 1 is viewed from the top, the distance is preferably set such that the short sides of the battery container 2 overlap with the outer long sides of the tank containers 3 and 4 in the parallel direction. In that case, a region surrounded by outlines of the two tank containers 3 and 4 can be substantially expressed by the formula "(length in the longitudinal direction of the battery container 2)×(length in the longitudinal direction of the two tank containers 3 and 4)". Therefore, the installation area of the RF battery 1 can be decreased. In addition, although a portion (central portion in the longitudinal direction) of the bottom of the battery container 2 cannot be stacked on the roofs of the tank containers 3 and 4, four corners of the battery container 2 can be placed on the roofs of the tank containers 3 and 4. Usually, corners of a container have high strength. Therefore, since the four corners of the battery container 2 can be placed on the roofs of the two tank containers 3 and 4, the battery container 2 can be stably placed on the roofs of the two tank containers 3 and 4.

The placing positions of the battery container 2 on the roofs of the two containers 3 and 4 may be the centers in the longitudinal direction of the tank containers 3 and 4, but are preferably on the one end wall side in the longitudinal direction of the tank containers 3 and 4 (on the back side of the sheet in FIGS. 1 and 2) as shown in FIG. 1 (FIG. 2). That is, the battery container 2 is placed so as to be close to the one end side in the longitudinal direction of the tank containers 3 and 4. Specifically, when the RF battery 1 is viewed from the top, arrangement is made such that a long side of the battery container 2 overlaps with the short sides of the two tank containers 3 and 4. At that time, the short sides of the battery container 2 overlap with the outer long sides in the parallel direction of the tank containers 3 and 4. Thereby, two out of four corners of the battery container 2 each can overlap with a corner of the tank container 3 or 4. Consequently, the battery container 2 can be stably placed on the roofs of the two tank containers 3 and 4.

In addition, the worker can easily access the inside of the battery container 2 from one side surface of the battery container 2 (from the front side of the sheet in FIGS. 1 and 2), and maintenance of the inside of the battery container 2 can be easily performed. The reason for this is that since the battery container 2 is placed so as to be close to the one end side in the longitudinal direction of the two tank containers 3 and 4 (on the back side of the sheet in FIGS. 1 and 2), it is possible to secure wide space for the worker to be placed on the roofs of the two tank containers 3 and 4 on the other end side in the longitudinal direction. Preferably, a work floor that bridges between the two tank containers 3 and 4 is arranged so that the worker can easily work. When accessing the inside of the battery container 2 from the other side surface of the battery container 2 (from the back side of the sheet in FIGS. 1 and 2), a platform (bench) with a predetermined height may be temporarily provided on the other side surface side of the battery container 2.

Furthermore, in the case where the placing positions of the battery container 2 are the centers in the longitudinal direction of the two tank containers 3 and 4, access into the inside is possible from both side surfaces of the battery container 2. In this case, preferably, reinforcing pillars are provided at positions overlapping with the short sides of the battery container 2 in the tank containers 3 and 4, and in particular, at positions overlapping with the corners of the battery container 2 in the tank containers 3 and 4. The reason for this is that the strength of the centers in the longitudinal direction of the tank containers 3 and 4 is not as high as the strength of the corners thereof.

Preferably, exposed portions of the outer peripheries of the tank containers 3 and 4 are covered with a heat insulating material (not shown). Thereby, it is easy to suppress changes in temperature of electrolytes due to the external environment. For example, it is preferable to cover the outer peripheries excluding regions overlapping with the battery container 2 in the tank containers 3 and 4 (including the side surfaces facing each other) with a heat insulating material (not shown).

(Parallel-Stacking Type)

In the parallel-stacking type, as shown in FIGS. 3 and 4, two tank containers 3 and 4 are arranged in parallel such that the longitudinal directions thereof are parallel to each other, and a battery container 2 is placed on the roofs of the two tank containers 3 and 4 such that the longitudinal direction of the battery container 2 is parallel to the longitudinal directions of the two tank containers 3 and 4 (stacked into a so-called heaped bale structure). Although details will be described later, in the parallel-stacking type, since the contact area A among the three containers can be increased compared with the cross-stacking type, the total surface area Sb is easily decreased, and the surface area reduction rate Sc is easily increased. In this type, as in the cross-stacking type, the side surfaces of the two tank containers 3 and 4 face each other.

Unlike the cross-stacking type, the two tank containers 3 and 4 on the lower side are preferably arranged such that the side surfaces thereof are in contact with each other over the substantially entire region, substantially without a distance between the facing side surfaces. Thereby, the installation area of the RF battery 1 can be further decreased compared with the cross-stacking type. By bringing the side surfaces of the two tank containers 3 and 4 into contact with each other, the contact area A among the three containers 2, 3, and 4 can be increased compared with the cross-stacking type in which the two tank containers 3 and 4 are arranged with a distance therebetween. In addition, since the substantially entire region of the bottom of the battery container 2 can be brought into contact with the two tank containers 3 and 4, the contact area A among the three containers 2, 3, and 4 can be increased compared with the cross-stacking type in which the bottom of the battery container 2 is only partially brought into contact with the two tank containers 3 and 4. Thus, since the substantially entire region of the bottom of the battery container 2 can be stacked on the roofs of the two tank containers 3 and 4, the battery container 2 can be stably placed. Furthermore, since the worker can access the inside of the battery container 2 from both side surfaces thereof, unlike the cross-stacking type, a platform may not be temporarily provided. The reason for this is that working space can be secured on the roofs on the outer sides in the parallel direction of the tank containers 3 and 4 (on the opposite sides to the sides facing each other). Furthermore, since it is possible to reduce space between the facing side surfaces of the two tank containers 3 and 4, a heat insulating material may not be arranged on the facing side surfaces, and the operation of covering with the heat insulating material can be simplified, resulting in reduction in costs.

For example, in the case where the size of the two tank containers 3 and 4 is set to be larger than the size of the battery container 2 as shown in FIG. 4, the placing positions of the battery container 2 on the roofs of the two containers 3 and 4 are preferably on the one end wall side in the longitudinal direction of the tank containers 3 and 4 (on the back side of the sheet in FIG. 4), as in the cross-stacking type. Specifically, when the RF battery 1 is viewed from the top, arrangement is made such that one short side of the battery container 2 overlaps with the short sides of the two tank containers 3 and 4. In this case, preferably, reinforcing beams 3*b* and 4*b* for reinforcing tops are provided at positions overlapping with the other short side of the battery container 2 on the tops of the tank containers 3 and 4. Furthermore, preferably, reinforcing pillars are provided at positions corresponding to the other short side of the battery container 2 at the side walls of the tank containers 3 and 4 (on the same plane as the reinforcing beams 3*b* and 4*b*). In FIG. 4, only a reinforcing pillar 4*c* at one side wall of the negative electrolyte tank container 4 is shown, and a reinforcing pillar at the other side wall (on the side facing the positive electrolyte tank container 3) and reinforcing pillars at both side walls of the positive electrolyte tank container 3 are omitted.

Furthermore, in the case where the battery container 2 is placed on the roofs of the two tank containers 3 and 4 at the centers in the longitudinal direction thereof, preferably, reinforcing beams are provided on the tops of the tank containers 3 and 4 at positions overlapping with the short sides of the battery container 2. Furthermore, preferably, reinforcing pillars are provided on the side walls of the tank containers 3 and 4 at positions corresponding to the short sides of the battery container 2.

(Collinear-Stacking Type)

In the collinear-stacking type, as shown in FIGS. 5 and 6, two tank containers 3 and 4 are arranged in series such that the longitudinal directions thereof are collinear with each other, and a battery container 2 is placed on the roofs of the two tank containers 3 and 4 such that the longitudinal direction of the battery container 2 is collinear with the longitudinal directions of the two tank containers 3 and 4. Although details will be described later, in the collinear-stacking type, since the contact area A among the three containers can be increased compared with the cross-stacking type, the total surface area Sb is easily decreased, and the surface area reduction rate Sc is easily increased. In this type, the end surfaces of the two tank containers 3 and 4 face each other. The longitudinal directions of the three containers 2, 3, and 4 are all collinear.

The two tank containers 3 and 4 on the lower side are preferably arranged such that the end surfaces thereof are in contact with each other over the substantially entire region, substantially without a distance between the end surfaces of the tank containers 3 and 4, as in the parallel-stacking type. Thereby, as in the parallel-stacking type, the installation area of the RF battery 1 can be decreased. The end surfaces of the two tank containers 3 and 4 are brought into contact with each other, and also the substantially entire region of the bottom of the battery container 2 can be brought into contact with the two tank containers 3 and 4. Accordingly, the contact area A among the three containers 2, 3, and 4 can be increased compared with the cross-stacking type in which the two tank containers 3 and 4 are arranged with a distance therebetween and the bottom of the battery container 2 is only partially brought into contact the tank container 3 and 4. Thus, since the substantially entire region of the bottom of the battery container 2 is stacked on the roofs of the two tank containers 3 and 4, the battery container 2 can be stably placed. Since it is possible to reduce space between the facing end surfaces of the two tank containers 3 and 4, a heat insulating material may not be arranged on the facing end surfaces. In the case where the worker accesses the inside of the battery container 2 from both side surfaces thereof, platforms may be temporarily provided.

[Circulation of Electrolytes Between Containers]

Figure 7:
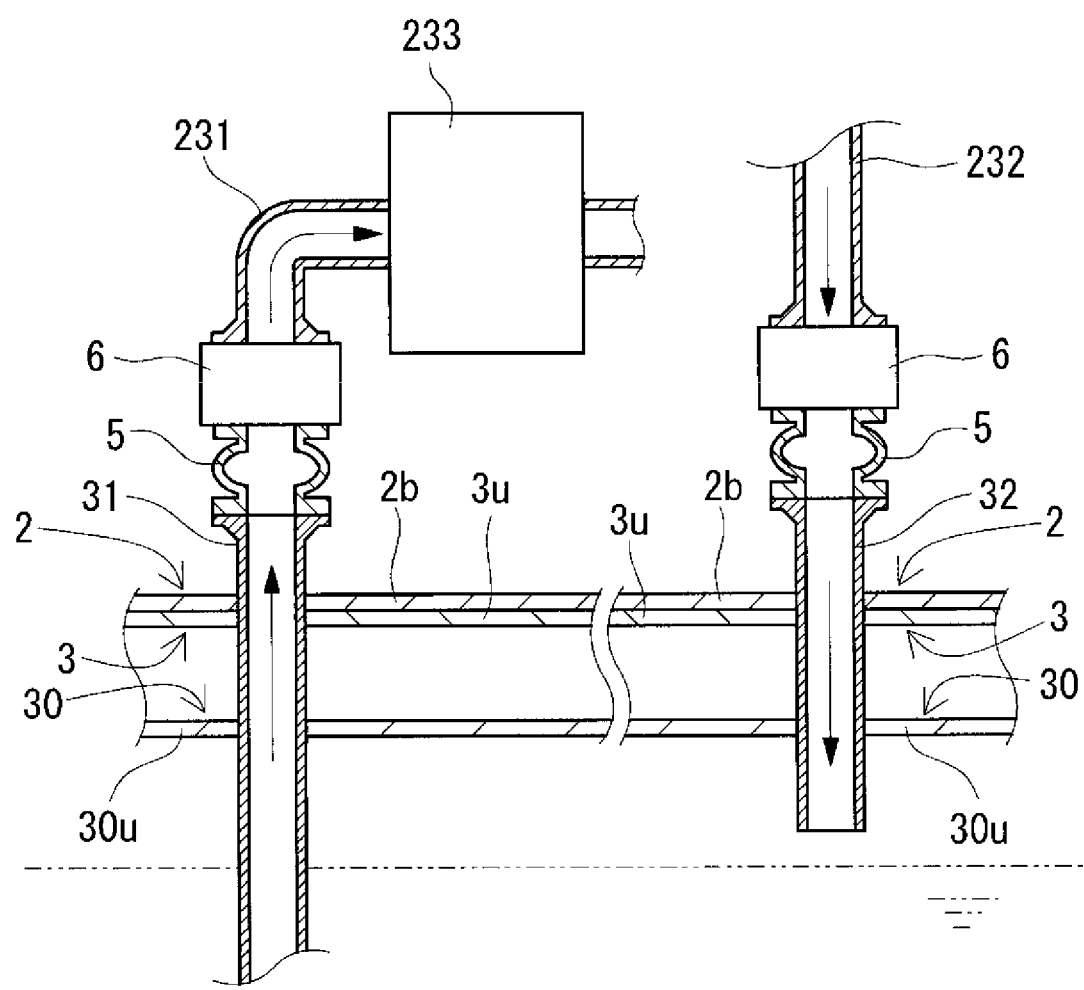
FIG. 7 is a partial sectional view schematically showing the state of the redox flow battery taken along the line VII-VII of FIG. 1.
Figure 8:
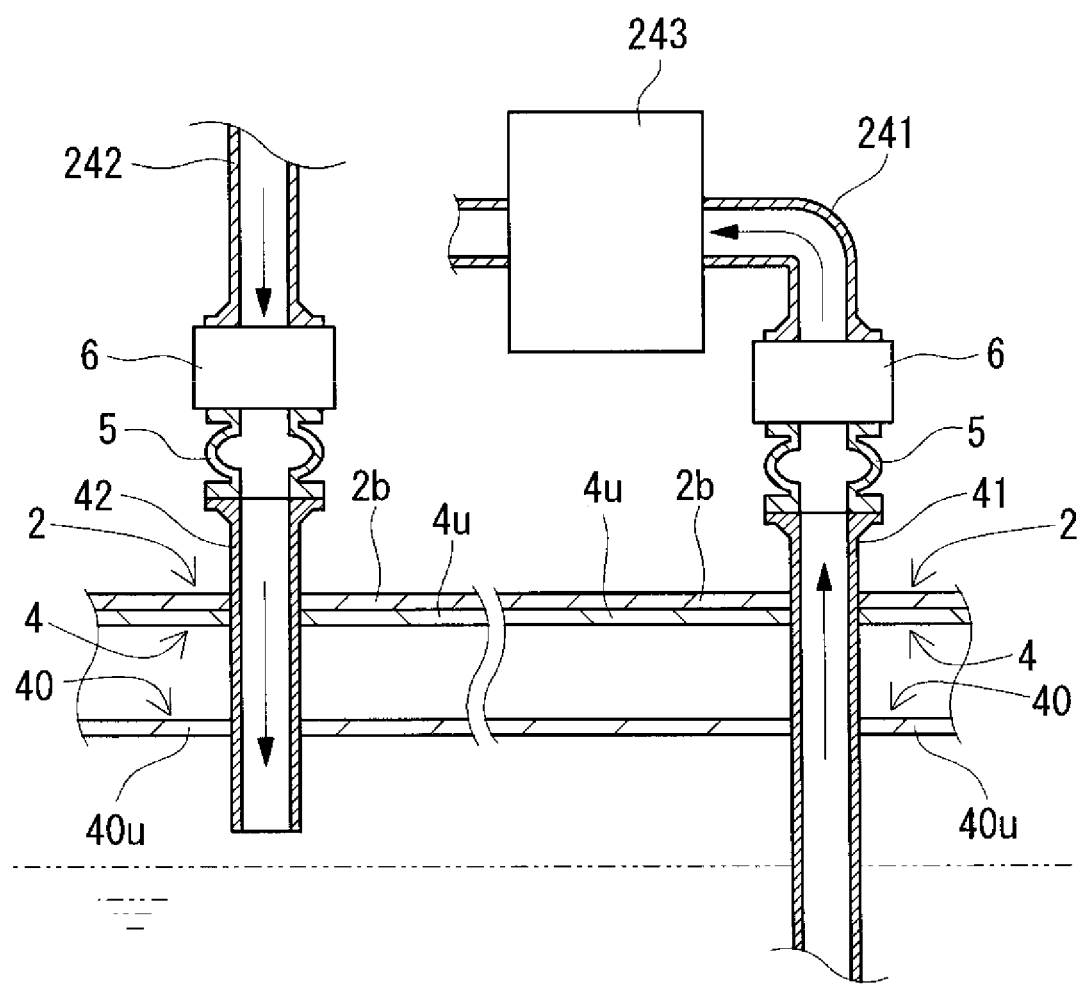
FIG. 8 is a partial sectional view schematically showing the state of the redox flow battery taken along the line VIII-VIII of FIG. 1.

The RF battery 1 includes positive and negative electrolyte circulation passages configured to circulate positive and negative electrolytes between the battery container 2 and the tank container 3 and between the battery container 2 and the tank container 4. The positive and negative electrolyte circulation passages respectively include, as shown in FIGS. 7 and 8 (appropriately, FIGS. 9 and 10), positive and negative electrolyte supply pipes 231 and 241, positive and negative electrolyte discharge pipes 232 and 242, positive and negative electrolyte outgoing pipes 31 and 41, positive and negative electrolyte return pipes 32 and 42, and connection structures 5. In this example, through-holes for inserting the circulation passages are formed in a bottom plate 2b constituting the bottom of the battery container 2 and top plates 3u and 4u constituting the tops of the tank containers 3 and 4 at positions overlapping with each other, and through-holes are formed in top plates 30u and 40u constituting the tops of the positive and negative electrolyte tanks 30 and 40 at positions corresponding to the overlapping positions. The through-holes overlap with each other so as to face each other (FIGS. 7 and 8).

(Positive and Negative Electrolyte Supply Pipes and Positive and Negative Electrolyte Discharge Pipes)

The positive and negative electrolyte supply pipes 231 and 241 supply the positive and negative electrolytes to positive and negative electrode cells 202 and 203, respectively, and the positive and negative electrolyte discharge pipes 232 and 242 discharge the positive and negative electrolytes from the positive and negative electrode cells 202 and 203, respectively. The positive and negative electrolyte supply pipes 231 and 241 and the positive and negative electrolyte discharge pipes 232 and 242 are arranged inside the battery container 2 in this example. The positive and negative electrolyte supply pipes 231 and 241 are connected at one end to the positive and negative electrolyte outgoing pipes 31 and 41, respectively, and the positive and negative electrolyte supply pipes 231 and 241 are connected at the other end to the positive and negative electrode cells 202 and 203, respectively. The positive and negative electrolyte discharge pipes 232 and 242 are connected at one end to the positive and negative electrode cells 202 and 203, respectively, and the positive and negative electrolyte discharge pipes 232 and 242 are connected at the other end to the positive and negative electrolyte return pipes 32 and 42, respectively.

(Positive and Negative Electrolyte Outgoing Pipes and Positive and Negative Electrolyte Return Pipes)

The positive and negative electrolyte outgoing pipes 31 and 41 send the positive and negative electrolytes to the positive and negative electrolyte supply pipes 231 and 241, respectively, and the positive and negative electrolyte return pipes 32 and 42 return the positive and negative electrolytes from the positive and negative electrolyte discharge pipes 232 and 242 to the positive and negative electrolyte tanks 30 and 40, respectively. In this example, the positive and negative electrolyte outgoing pipes 31 and 41 and the positive and negative electrolyte return pipes 32 and 42 are provided so as to extend from the inside of the positive and negative electrolyte tanks 30 and 40 and protrude toward the outside of the tank containers 3 and 4, and pass through the through-holes to reach the inside of the battery container 2. An intervening member (e.g., a rubber nozzle) is disposed in the space between each of the positive and negative electrolyte outgoing pipes 31 and 41 and positive and negative the electrolyte return pipes 32 and 42 and the corresponding through-hole in the electrolyte tank 30 or 40, the intervening member filling the space to prevent electrolyte leakage from the space. The positive and negative electrolyte outgoing pipes 31 and 41 and the positive and negative electrolyte return pipes 32 and 42 are fixed on the top plates 3u and 4u of the tank containers 3 and 4, respectively, in order to prevent positional shift in the longitudinal direction. The fixing is performed, for example, by screwing a flange (not shown) mounted on each of the positive and negative electrolyte outgoing pipes 31 and 41 and the electrolyte return pipes 32 and 42 around the corresponding through-hole in the top plate 3u or 4u of the tank container 3 or 4.

One end portion of each of the positive and negative electrolyte outgoing pipes 31 and 41 is open to the corresponding positive or negative electrolyte inside the positive or negative electrolyte tank 30 or 40. The position in the height direction of the one end portion of each of the positive and negative electrolyte outgoing pipes 31 and 41 is set to be below the lowest liquid level (not shown) of the corresponding electrolyte tank 30 or 40. In this example, the other end portion of each of the electrolyte outgoing pipes 31 and 41 is connected to the corresponding electrolyte supply pipe 231 or 241 inside the battery container 2. In such a manner, connection portions (connection structures 5) between the positive electrolyte outgoing pipe 31 and the positive electrolyte supply pipe 231 and between the negative electrolyte outgoing pipe 41 and the negative electrolyte supply pipe 241 are arranged inside the battery container 2.

One end portion of each of the positive and negative electrolyte return pipes 32 and 42 is open to the gas phase inside the corresponding electrolyte tank 30 or 40. The position in the height direction of the one end portion of each of the positive and negative electrolyte return pipes 32 and 42 is set to be above the highest liquid level (indicated by the two-dot chain line in FIGS. 7 to 9) of the corresponding electrolyte tank 30 or 40. In this example, the other end portion of each of the positive and negative electrolyte return pipes 32 and 42 is connected to the corresponding electrolyte discharge pipe 232 or 242 inside the battery container 2. In such a manner, connection portions (connection structures 5) between the positive electrolyte return pipe 32 and the positive electrolyte discharge pipe 232 and between the negative electrolyte return pipe 42 and the negative electrolyte discharge pipe 242 are arranged inside the battery container 2.

As the constituent material for the pipes 231, 232, 241, and 242, the positive and negative electrolyte outgoing pipes 31 and 41, and the positive and negative electrolyte return pipes 32 and 42, a material that does not react with electrolytes and has excellent resistance to electrolytes may be used. Specific examples thereof include polypropylene (PP), polyvinyl chloride (PVC), polyethylene (PE), polytetrafluoroethylene (PTFE), and rubber. In addition, regarding the pipes 231, 232, 241, and 242, the positive and negative electrolyte outgoing pipes 31 and 41, and the positive and negative electrolyte return pipes 32 and 42, pipes each including a tubular member made of metal and a coating layer covering a position of the tubular member in contact with the electrolyte may be used. As the tubular member, for example, a stainless steel pipe may be used. Examples of the material for the coating layer include the resins and rubber described above.

(Connecting Structure)

The connection structures 5 connect the positive and negative electrolyte supply pipes 231 and 241 and the positive and negative electrolyte discharge pipes 232 and 242 to the positive and negative electrolyte outgoing pipes 31 and 41 and the positive and negative electrolyte return pipes 32 and 42, respectively. The arrangement positions of the connection structures 5 between the pipe 231 and the outgoing pipe 31 and between the pipe 232 and the return pipe 32 on the positive electrode side and the arrangement positions of the connection structures 5 between the pipe 241 and the outgoing pipe 41 and between the pipe 242 and the return pipe 42 on the negative electrode side are inside the battery container 2 as described above in this example, but are not particularly limited, and can be appropriately selected as shown in modification examples which will be described later.

The connection structures 5 on the positive and negative electrode sides (connection of the positive and negative electrolyte outgoing pipes 31 and 41 to the positive and negative electrolyte supply pipes 231 and 241, respectively, and connection of the positive and negative electrolyte return pipes 32 and 42 to the positive and negative electrolyte discharge pipes 232 and 242, respectively) are preferably detachable. Thereby, changes in design of battery capacity, battery output, and the like can be easily made. The reason for this is that when the containers themselves are exchanged due to occurrence of changes in design of battery capacity, battery output, and the like, the pipes can be easily detached. Usually, electrolyte flow pipes are connected to each other by using fusion bonding or the like so as not to be detached from each other. Thus, once the pipes are connected to each other, the disassembly operation is likely to be very complicated.

The connection structures 5 on the positive and negative electrode sides are preferably capable of expanding and contracting. In that case, when the positive and negative electrolyte outgoing pipes 31 and 41 are connected to the positive and negative electrolyte supply pipes 231 and 241, respectively, and the positive and negative electrolyte return pipes 32 and 42 are connected to the positive and negative electrolyte discharge pipes 232 and 242, respectively, the pipes are easily aligned, and therefore, the operation of connecting the pipes can be easily performed. For example, flexible joints may be used for the connection structures 5 on the positive and negative electrode sides.

Here, valves 6 for opening and closing the positive or negative electrolyte circulation passage are interposed between the connection structures 5 (flexible joints) and the positive and negative electrolyte supply pipes 231 and 241 and between the connection structures 5 (flexible joints) and the positive and negative electrolyte discharge pipes 232 and 242. The type of valves 6 can be appropriately selected, and examples thereof include butterfly valves, gate valves, globe valves, ball valves, and diaphragm valves.

[Members Housed Inside Battery Container]

Figure 9:
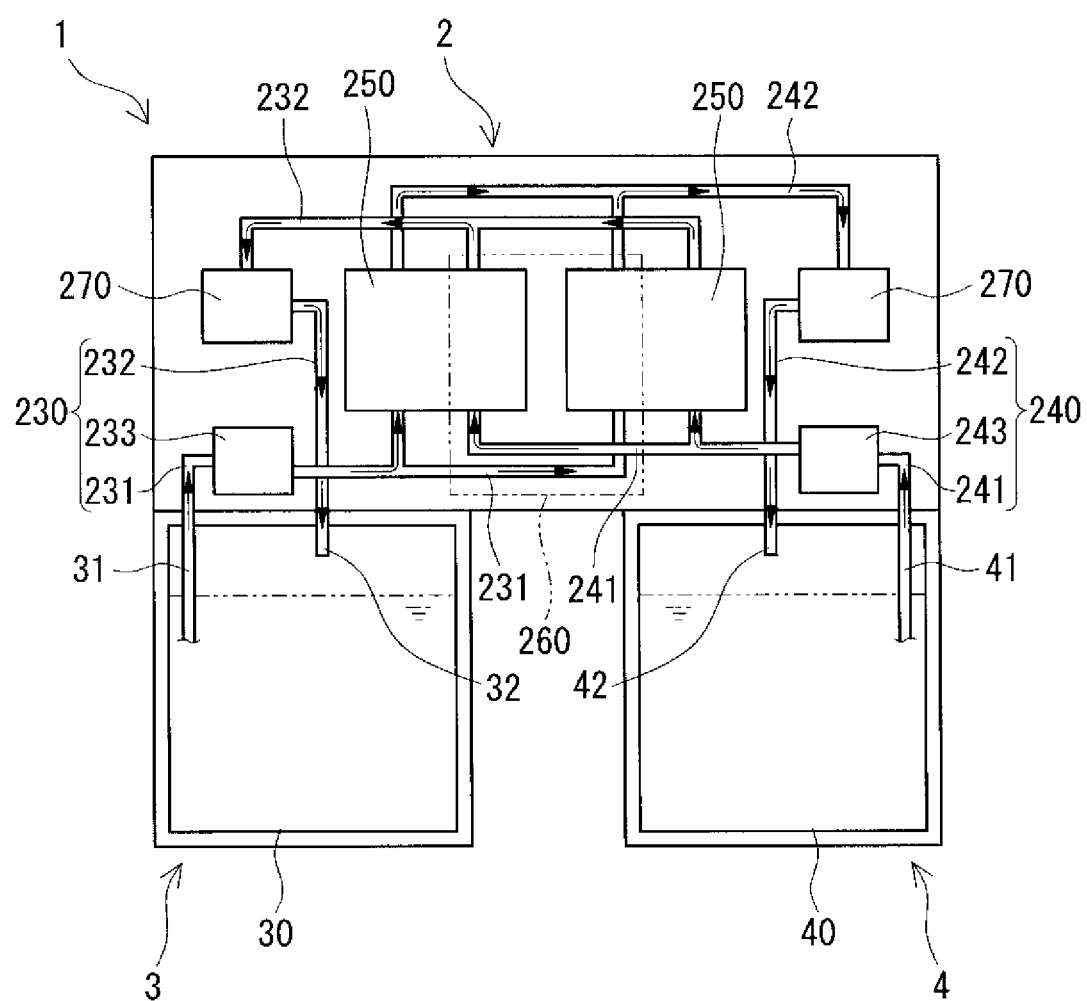
FIG. 9 is a schematic diagram of a redox flow battery according to the embodiment.

As described above, the battery container 2 houses the battery cell 200, the positive electrolyte circulation mechanism 230, and the negative electrolyte circulation mechanism 240 (FIG. 9).

[Battery Cell]

Figure 10:
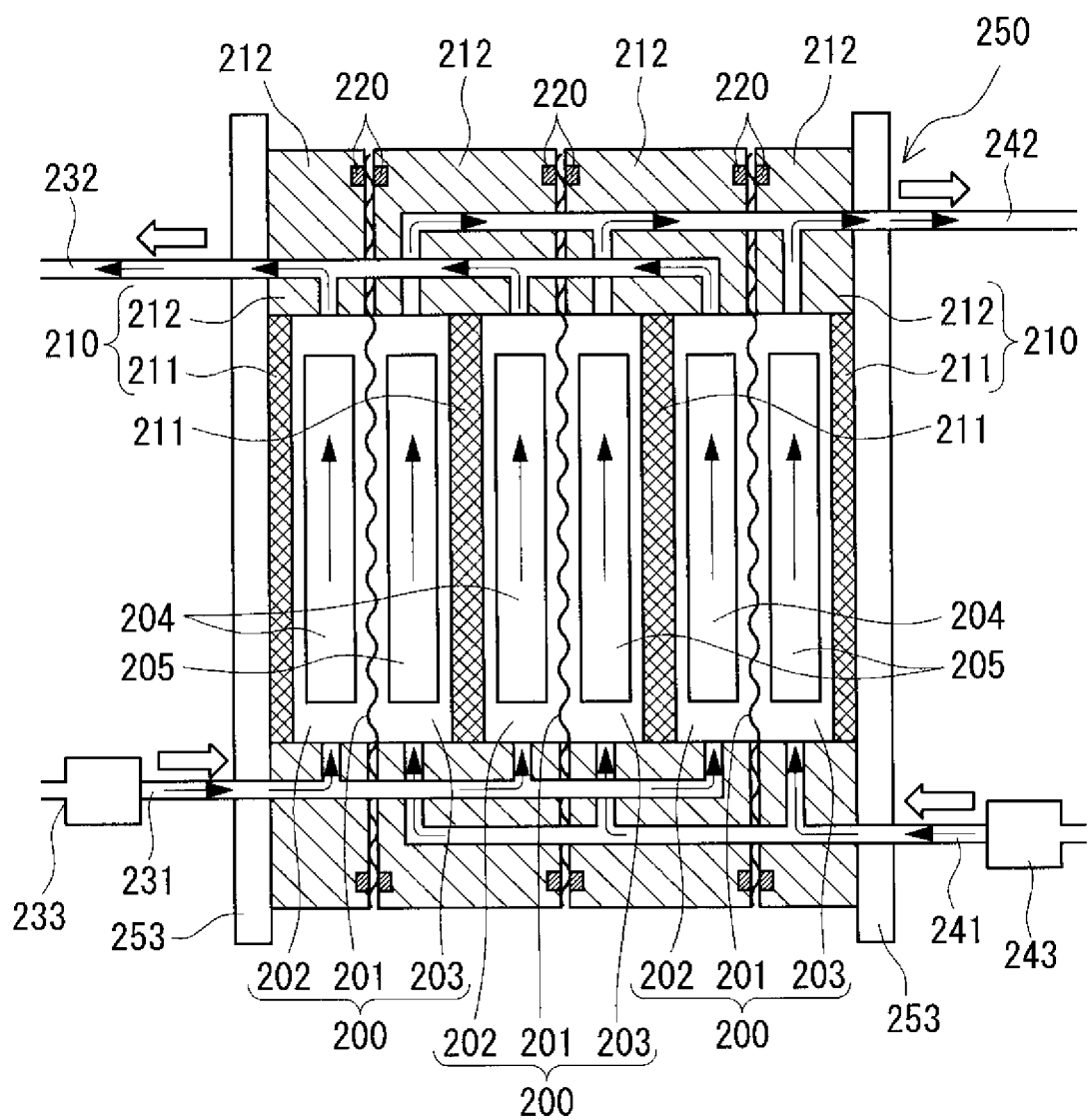
FIG. 10 is a schematic sectional view of a cell stack inside a battery container included in a redox flow battery according to the embodiment.
Figure 11:
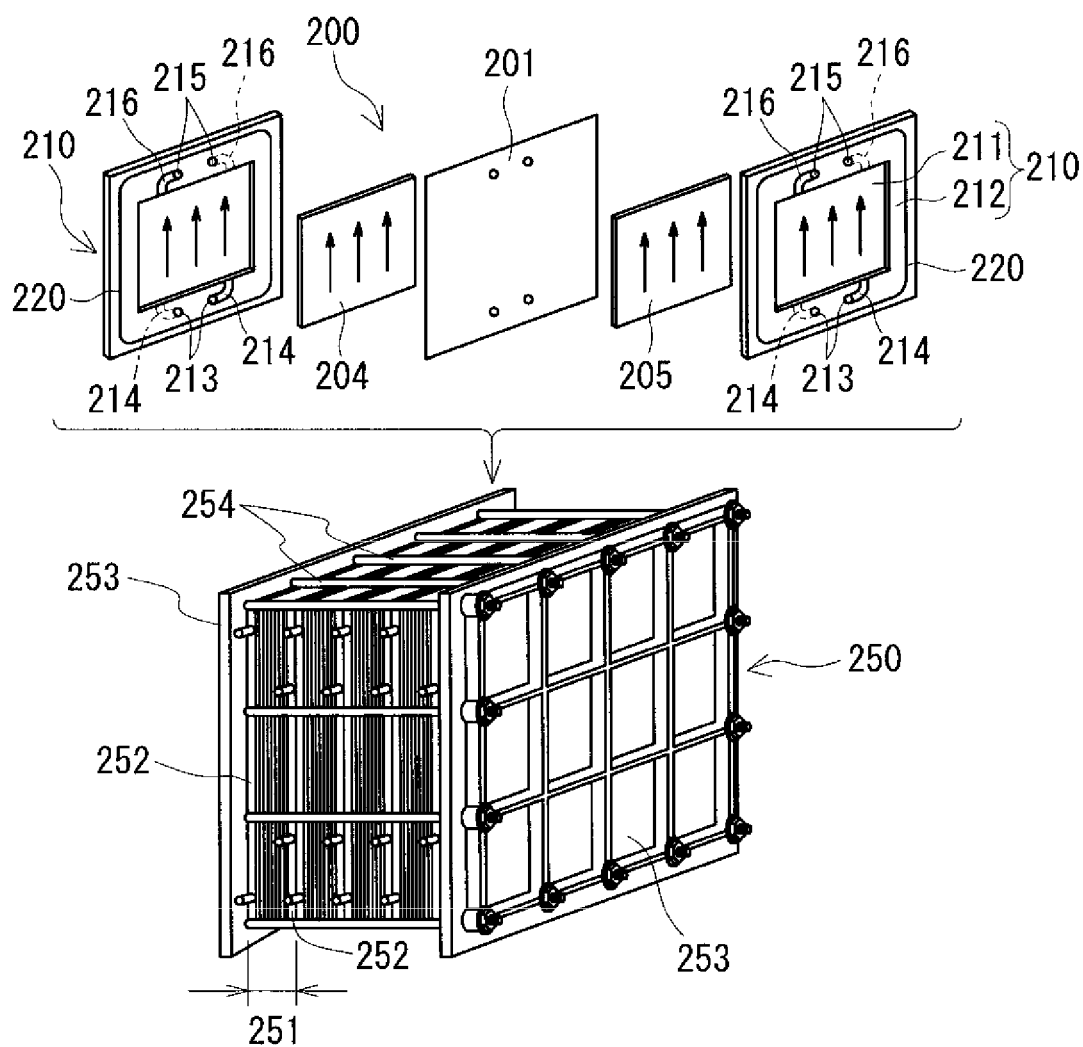
FIG. 11 is a schematic diagram of a cell stack included in a redox flow battery according to the embodiment.

A battery cell 200 is separated into a positive electrode cell 202 and a negative electrode cell 203 by a membrane 201 that allows hydrogen ions to permeate therethrough (FIGS. 10 and 11). The positive electrode cell 202 contains a positive electrode 204, and the positive electrolyte is circulated thereto by the positive electrolyte circulation mechanism 230. The negative electrode cell 203 contains a negative electrode 205, and the negative electrolyte is circulated thereto by the negative electrolyte circulation mechanism 240.

[Cell Stack]

The battery cell 200 is usually formed inside a structure referred to as a cell stack 250 shown in FIGS. 9 and 10 and the view of the lower part of FIG. 11. The number of cell stacks 250 may be single or plural. In this example, the case where the number of cell stacks 250 is two is illustrated (FIG. 9). In the case where the number of cell stacks 250 is single, the arrangement position of the cell stack 250 is preferably the center in the longitudinal direction of the battery container 2. In the case where the number of cell stacks 250 is plural, a plurality of cell stacks 250 are preferably arranged at positions that are symmetrical with respect to the center in the longitudinal direction of the battery container 2. Thereby, it is possible to suppress deviation of the center of gravity of the battery container 2.

Each cell stack 250 is configured such that a layered body referred to as a sub-stack 251 (the view of the lower part of FIG. 11) is sandwiched between two end plates 253 and the end plates 253 are fastened with a fastening mechanism 254. The configuration including a plurality of sub-stacks 251 is illustrated in the view of the lower part of FIG. 11. As shown in FIG. 10 and the view of the upper part of FIG. 11, the sub-stack 251 is formed by stacking a cell frame 210 having a bipolar plate 211 and a frame body 212 surrounding the outer periphery thereof, a positive electrode 204, a membrane 201, and a negative electrode 205 in this order repeatedly, and supply/drainage plates 252 (the view of the lower part of FIG. 11; omitted in FIG. 10) are disposed on both ends of the layered body. A battery cell 200 is formed between bipolar plates 211 of two adjacent cell frames 210. A positive electrode 204 (positive electrode cell 202) of one of two adjacent battery cells 200 and a negative electrode 205 (negative electrode cell 203) of the other one of the two adjacent battery cells 200 are disposed on the front and back of a bipolar plate 211 while sandwiching the bipolar plate 211. The frame body 212 of the cell frame 210 includes liquid supply manifolds 213 and liquid supply slits 214 for supplying electrolytes to the inside of the battery cell 200 and liquid discharge manifolds 215 and liquid discharge slits 216 for discharging electrolytes to the outside of the battery cell 200. A ring-shaped sealing member 220, such as an O-ring or flat packing, is disposed in a ring-shaped sealing groove between two adjacent frame bodies 212 so that leakage of the electrolytes from the battery cell 200 can be suppressed.

[Positive Electrolyte Circulation Mechanism and Negative Electrolyte Circulation Mechanism]

The positive electrolyte circulation mechanism 230 and the negative electrolyte circulation mechanism 240 include a positive electrolyte supply pipe 231 and a negative electrolyte supply pipe 241, a positive electrolyte discharge pipe 232 and a negative electrolyte discharge pipe 242, and a positive electrolyte pump 233 and a negative electrolyte pump 243, respectively (FIG. 9). The positive and negative electrolyte supply pipes 231 and 241 and the positive and negative electrolyte discharge pipes 232 and 242 are as described above.

(Positive and Negative Electrolyte Pumps)

The positive and negative electrolyte pumps 233 and 243 circulate the positive and negative electrolytes. Specifically, during charging and discharging operation, the positive and negative electrolytes are supplied from the positive and negative electrolyte tanks 30 and 40 through the positive and negative electrolyte outgoing pipes 31 and 41 and the positive and negative electrolyte supply pipes 231 and 241 to the positive and negative electrode cells 202 and 203, respectively, and discharged from the positive and negative electrode cells 202 and 203 through the positive and negative electrolyte discharge pipes 232 and 242 and the positive and negative electrolyte return pipes 32 and 42 to the positive and negative electrolyte tanks 30 and 40, respectively, by the positive and negative electrolyte pumps 233 and 243. Thus, circulation to the positive and negative electrode cells 202 and 203 is performed. During a standby period in which charging and discharging are not performed, the positive and negative electrolyte pumps 233 and 243 are stopped so that the positive and negative electrolytes are not circulated. As the positive and negative electrolyte pumps 233 and 243, any type can be appropriately selected, and for example, self-suction pumps can be used. The positive and negative electrolyte pumps 233 and 243 are provided in the middle of the positive and negative electrolyte supply pipes 231 and 241, respectively, in this example. Preferably, the positive electrolyte pump 233 and the negative electrolyte pump 243 are arranged at positions that are symmetrical with respect to the center in the longitudinal direction of the battery container 2. Thereby, it is possible to suppress deviation of the center of gravity of the battery container 2.

[Others]

The battery container 2 can further house a control unit 260, a heat exchanger 270, and the like.

(Control Unit)

The control unit 260 controls circulation of the positive and negative electrolytes in the positive electrolyte circulation mechanism 230 and the negative electrolyte circulation mechanism 240, respectively. The control unit 260, specifically, includes a pump control unit which controls the positive and negative electrolyte pumps provided in the positive and negative electrolyte circulation mechanisms. As the control unit 260, for example, a computer or the like can be used. Furthermore, the control unit 260 may be arranged outside the three containers 2 to 4.

(Heat Exchanger)

The heat exchanger 270 cools the positive and negative electrolytes. The positive and negative electrolytes may be cooled by spontaneous cooling or forced cooling with a cooling mechanism, such as a fan, provided separately (not shown). In this example, the number of heat exchangers 270 is plural (two), and the positive and negative electrolytes are individually cooled. The arrangement positions of the heat exchangers 270 are in the middle of the positive and negative electrolyte discharge pipes 232 and 242 in this example, but may be in the middle of the positive and negative electrolyte supply pipes 231 and 241. The positive and negative electrolytes generate heat as a result of battery reactions. Accordingly, by setting the arrangement positions of the heat exchangers 270 to be in the middle of the positive and negative electrolyte discharge pipes 232 and 242, the positive and negative electrolytes can be satisfactorily cooled. The heat exchanger 270 for cooling the positive electrolyte and the heat exchanger 270 for cooling the negative electrolyte are preferably arranged at positions that are symmetrical with respect to the center in the longitudinal direction of the battery container 2. Thereby, it is possible to suppress deviation of the center of gravity of the battery container 2.

[Members Housed Inside Tank Containers]

The positive electrolyte tank container 3 and the negative electrolyte tank container 4 house a positive electrolyte tank 30 and a negative electrolyte tank 40, a positive electrolyte outgoing pipe 31 and a negative electrolyte outgoing pipe 41, and a positive electrolyte return pipe 32 and a negative electrolyte return pipe 42, respectively. The positive and negative electrolyte outgoing pipes 31 and 41 and the positive and negative electrolyte return pipes 32 and 42 are as described above.

[Positive and Negative Electrolyte Tanks]

The positive and negative electrolyte tanks 30 and 40 are each a box-like case, whose shape is the same as the tank containers 3 and 4 and is rectangular parallelepiped in this example. The size of the positive and negative electrolyte tanks 30 and 40 is slightly smaller than that of the tank containers 3 and 4. As the constituent material for the positive and negative electrolyte tanks 30 and 40, the same resins and rubber as those used for the coating layer of the positive electrolyte supply pipe 231 and the like may be used. Connection of the positive and negative electrolyte outgoing pipes 31 and 41 and the positive and negative electrolyte return pipes 32 and 42 to the electrolyte tanks 30 and 40 is performed by the intervening member which fills the space between each of the positive and negative electrolyte outgoing pipes 31 and 41 and the positive and negative electrolyte return pipes 32 and 42 and the corresponding through-hole in the positive or negative electrolyte tank 30 or 40. The intervening members are mounted on the positive and negative electrolyte outgoing pipes 31 and 41 and the positive and negative electrolyte return pipes 32 and 42 so as to avoid positional shift in the longitudinal direction of the positive and negative electrolyte outgoing pipes 31 and 41 and the positive and negative electrolyte return pipes 32 and 42.

[Others]

The positive and negative electrolyte tank containers 3 and 4 can further house gas phase communicating tubes (a positive electrode gas phase insertion tube and a negative electrode gas phase insertion tube) which connect the gas phase inside the positive electrolyte tank 30 and the gas phase inside the negative electrolyte tank 40 to each other, and a pressure adjustment mechanism for adjusting the pressure of the gas phase inside each of the positive and negative electrolyte tanks 30 and 40 (both not shown). One end of the positive electrode gas phase insertion tube is open to the gas phase inside the positive electrolyte tank 30, and one end of the negative electrode gas phase insertion tube is open to the gas phase inside the negative electrolyte tank 40. The other end of the positive electrode gas phase insertion tube and the other end of the negative electrode gas phase insertion tube are connected to each other inside one of the tank containers or outside the two tank containers 3 and 4. For this connection, a detachable connection structure, as in the connection structure 5 described above, or a connection structure capable of expanding and contracting can be used. As the pressure adjustment mechanism, a known pressure adjustment bag that expands or contracts in response to changes in the pressure of the gas phase inside each of the positive and negative electrolyte tanks 30 and 40 can be used. The pressure adjustment mechanism may be provided either inside or outside each of the positive and negative electrolyte tanks 30 and 40.

[Design Change Procedure]

Changes in design of the RF battery 1 can be made, for example, as described below.

(Changes of Battery Capacity)

In the case where the battery capacity is increased (decreased), only the tank containers 3 and 4 of the RF battery 1 shown in each of FIG. 1 (FIG. 2), FIG. 3 (FIG. 4), and FIG. 5 (FIG. 6) are exchanged for larger (smaller) tank containers 3 and 4, as shown in each of FIG. 2 (FIG. 1), FIG. 4 (FIG. 3), and FIG. 6 (FIG. 5). First, the battery container 2 on the tank containers 3 and 4 installed on the installation place is moved from the top of the tank containers 3 and 4 to a predetermined position that does not overlap with the tank containers 3 and 4. Next, in order to make the installation place empty, the installed tank containers 3 and 4 are moved from the installation place. Next, larger (smaller) tank containers 3 and 4 are moved to the empty installation place. Then, the battery container 2 which has been moved to the predetermined position is placed on the newly installed tank containers 3 and 4. The containers themselves can be moved by using an appropriate crane or the like. Then, the pipes 231, 232, 241, and 242, the positive and negative electrolyte outgoing pipes 31 and 41, and the positive and negative electrolyte return pipes 32 and 42 are connected with connection structures 5 inside the battery container 2 to construct electrolyte circulation passages (FIGS. 7 and 8).

(Changes of Battery Output)

In the case where the battery output is increased (decreased), although not shown, the battery container 2 of the RF battery 1 shown in each of FIGS. 1 to 6 may be exchanged for a larger (smaller) battery container 2. In the case where the battery output of the RF battery 1 shown in FIG. 1 or 2 is increased (decreased), before placing a larger (smaller) battery container 2 on the tank containers 3 and 4, the distance between the tank containers 3 and 4 may be increased (decreased). In the case where the distance between the tank containers 3 and 4 is increased, an empty container or an appropriate support having the same supporting strength as the container may be arranged separately on the lower side of the battery container 2 between the tank containers 3 and 4 in order to support the battery container 2 from below. In the case of the RF battery 1 shown in FIG. 5 or 6, since only the battery container 2 placed on the tank containers 3 and 4 is exchanged, the tank containers 3 and 4 can be used directly without being moved. The subsequent connection of the pipes is performed in the same manner as in the case of changing the battery capacity. Furthermore, the battery output can be increased by increasing the number of battery containers 2 without changing the size of the battery container 2. Furthermore, the battery output can also be increased by constituting a battery module including the three containers 2, 3, and 4, and increasing the number of battery modules (installing more battery modules).

Although details will be described later, in the case where a plurality of battery modules are involved, and even when each of the battery modules is any of the cross-stacking type, the parallel-stacking type, and the collinear-stacking type, the contact area A among the containers can be increased compared with the case where each of the battery modules is the non-stacking type. Therefore, the total surface area Sb is easily decreased, and the surface area reduction rate Sc is easily increased.

Regarding the arrangement of a plurality of battery modules, even when each of the battery modules is any of the cross-stacking type, the parallel-stacking type, and the collinear-stacking type, adjacent battery modules may be arranged with a distance therebetween, or adjacent battery modules may be arranged, substantially without a distance therebetween, such that the adjacent battery modules are in contact with each other.

<Cross-Stacking Type>

In the case where a plurality of cross-stacking type battery modules are involved, for example, the following three arrangements (a) to (c) may be used:

(a) The battery modules are arranged in the parallel direction of the tank containers 3 and 4.

(b) The battery modules are arranged in a direction orthogonal to both the parallel direction and the vertical direction of the tank containers 3 and 4.

(c) Both the arrangement (a) and the arrangement (c) are used.

In the arrangement (a), for example, the longitudinal directions of the battery containers 2 are collinear with each other, and the end surfaces of the battery containers 2 of the adjacent battery modules face (are in contact with) each other over the substantially entire region. For example, the side surfaces of the tank containers 3 and 4 of the adjacent battery modules face (are in contact with) each other over the substantially entire region.

In the arrangement (b), for example, the respective longitudinal directions of the tank containers 3 and 4 of the battery modules are collinear with each other, and the respective end surfaces of the tank containers 3 and 4 of the adjacent battery modules face (are in contact with) each other over the substantially entire region. The side surfaces of the battery containers 2 of the adjacent battery modules may be in contact with each other over the substantially entire region, or may face each other over the substantially entire region, but with a distance therebetween without being in contact with each other.

<Parallel-Stacking Type>

In the case where a plurality of parallel-stacking type battery modules are involved, for example, as in the cross-stacking type, the following three arrangements (a) to (c) may be used:

(a) The battery modules are arranged in the parallel direction of the tank containers 3 and 4.

(b) The battery modules are arranged in a direction orthogonal to both the parallel direction and the vertical direction of the tank containers 3 and 4.

(c) Both the arrangement (a) and the arrangement (c) are used.

In the arrangement (a), for example, the side surfaces of the tank containers 3 and 4 of the adjacent battery modules face (are in contact with) each other over the substantially entire region. The side surfaces of the battery containers 2 of the adjacent battery modules face each other over the substantially entire region, with a distance therebetween.

In the arrangement (b), for example, the respective longitudinal directions of the three containers 2, 3 and 4 of the battery modules are collinear with each other, and the respective end surfaces of the three containers 2, 3, and 4 of the adjacent battery modules face (are in contact with) each other over the substantially entire region.

<Collinear-Stacking Type>

In the case where a plurality of collinear-stacking type battery modules are involved, for example, the following three arrangements (a) to (c) may be used:

(a) The battery modules are arranged in a direction orthogonal to both the series direction and the vertical direction of the tank containers 3 and 4.

(b) The battery modules are arranged in the series direction of the tank containers 3 and 4.

(c) Both the arrangement (a) and the arrangement (c) are used.

In the arrangement (a), for example, the respective side surfaces of the three containers 2, 3, and 4 of the adjacent battery modules face (are in contact with) each other over the substantially entire region.

In the arrangement (b), for example, the respective longitudinal directions of the three containers 2, 3, and 4 of the battery modules are collinear with each other, and the end surfaces of the tank containers 3 and 4 of the adjacent battery modules face (are in contact with) each other over the substantially entire region. The side surfaces of the battery containers 2 of the adjacent battery modules face each other over the substantially entire region, with a distance therebetween.

[Application]

The RF battery 1 according to Embodiment 1 can be used as a storage battery, with respect to power generation by natural energy, such as solar power generation or wind power generation, for the purpose of stabilizing variation of power output, storing generated power during oversupply, leveling load, and the like. Furthermore, the RF battery 1 according to Embodiment 1 can be provided in a general power plant and used as a storage battery as countermeasures against voltage sag/power failure and for the purpose of leveling load.

[Operational Advantages]

In the RF battery 1 according to Embodiment 1, changes in design of battery capacity, battery output, and the like can be easily made. The reason for this is that the battery cell 200 and others, the positive electrolyte tank 30, and the negative electrolyte tank 40 are housed in the different containers 2, 3, and 4. The containers themselves can be exchanged easily, and members (the battery cell 200 and the positive and negative electrolyte tanks 30 and 40) requiring changes in design can be exchanged by exchanging the containers 2, 3, and 4 themselves housing the corresponding members. When the tank containers 3 and 4 and the battery container 2 themselves are exchanged for containers 2, 3, and 4 having different sizes, the amounts of electrolytes and the number of battery cells housed inside can be changed, and the battery capacity and battery output of the RF battery 1 can be changed. Furthermore, since the battery cell 200 and others, the positive electrolyte tank 30, and the negative electrolyte tank 40 are housed in the different containers 2, 3, and 4, the design freedom in the installation layout is high. Instead of changes in design, in the case where there is a need to exchange only the battery cell 200 or only the positive and negative electrolyte tanks 30 and 40 due to degradation over time, exchange can be easily performed by exchanging the containers 2, 3, and 4 themselves for containers with the same size.

MODIFICATION EXAMPLES

RF batteries according to modification examples differ from the RF battery 1 according to the embodiment in that the arrangement positions of the connection structures 5 between the pipe 231 and the outgoing pipe 31 and between the pipe 232 and the return pipe 32 on the positive electrode side and the arrangement positions of the connection structures 5 between the pipe 241 and the outgoing pipe 41 and between the pipe 242 and the return pipe 42 on the negative electrode side are not inside the battery container 2, but are set at positions shown in (1) to (4) below. In the modification examples, the difference from Embodiment 1 will be mainly described, and description will be omitted on the same configurations as those of Embodiment 1. In the following description, the arrangement positions of the connection structures 5 on the positive electrode side will be described. The arrangement positions of the connection structures 5 on the negative electrode side can be the same as the arrangement positions of the connection structures 5 on the positive electrode side.

Figure 12:
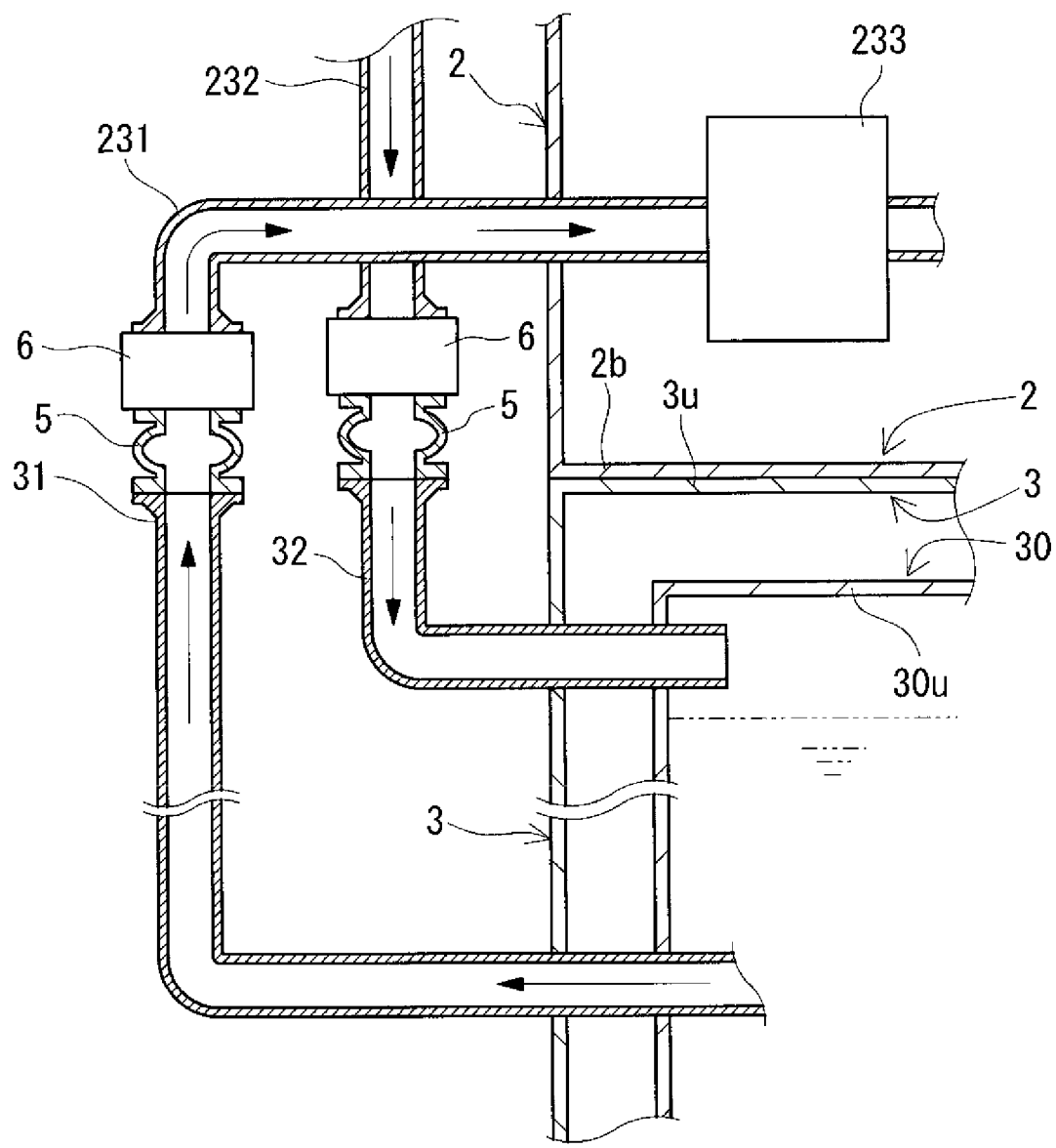
FIG. 12 is a partial sectional view schematically showing arrangement positions of connection structures included in a redox flow battery according to a modification example.
Figure 13:
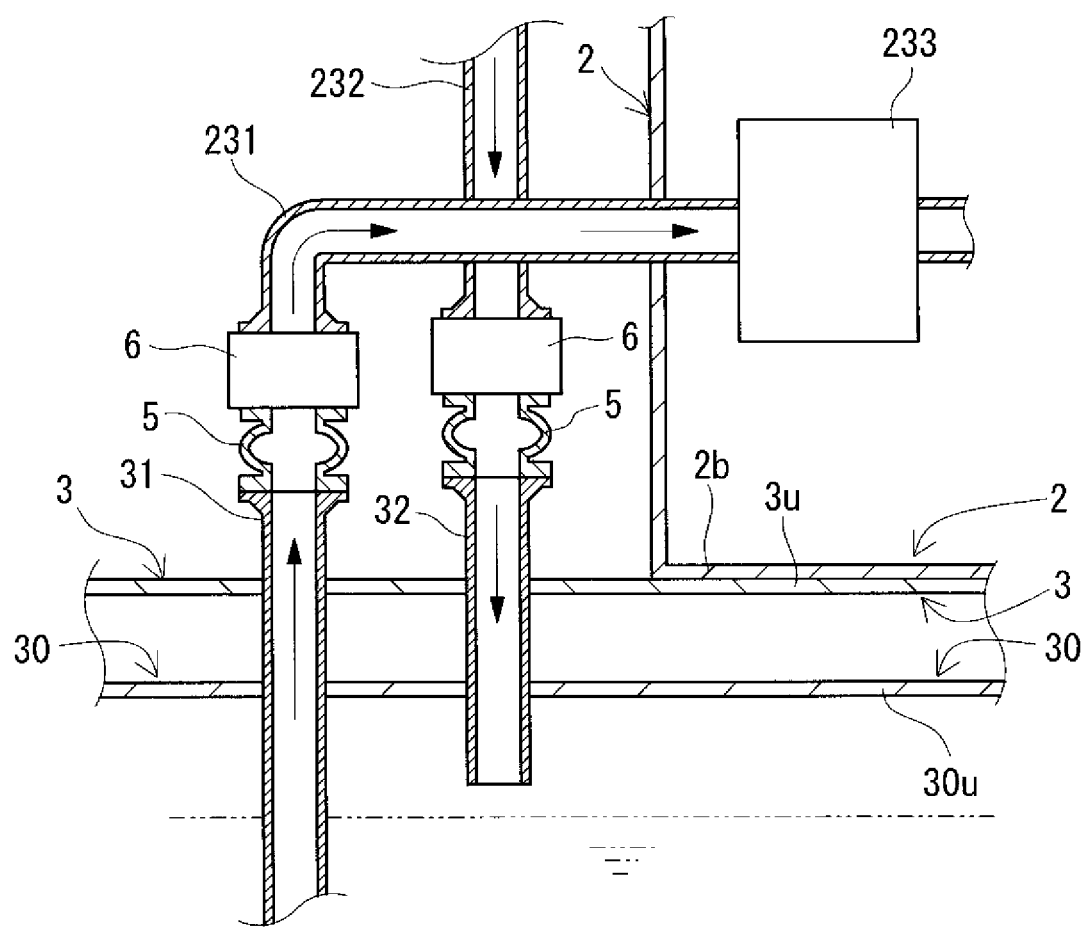
FIG. 13 is a partial sectional view schematically showing another example of arrangement positions of connection structures included in a redox flow battery according to a modification example.

(1) Both the connection structure 5 between the pipe 231 and the outgoing pipe 31 and the connection structure 5 between the pipe 232 and the return pipe 32 on the positive electrode side may be arranged outside the three containers 2 to 4 as shown in FIGS. 12 and 13.

As shown in FIG. 12, through-holes for inserting the positive electrolyte outgoing pipe 31 and the positive electrolyte return pipe 32 are not formed in the bottom plate 2b of the battery container 2 and the top plate 3u of the positive electrolyte tank container 3. Through-holes for inserting the positive electrolyte supply pipe 231 and the positive electrolyte discharge pipe 232 are formed in an end plate or side plate constituting the end wall or side wall of the battery container 2. Through-holes for inserting the positive electrolyte outgoing pipe 31 and the positive electrolyte return pipe 32 are formed in a side plate or end plate constituting the side wall or end wall of the positive electrolyte tank container 3.

As shown in FIG. 13, through-holes for inserting the positive electrolyte outgoing pipe 31 and the positive electrolyte return pipe 32 are not formed in a bottom plate 2b of the battery container 2. Through-holes for inserting the positive electrolyte supply pipe 231 and the positive electrolyte discharge pipe 232 are formed in a side plate or end plate of the battery container 2. Through-holes for inserting the positive electrolyte outgoing pipe 31 and the positive electrolyte return pipe 32 are formed in a top plate 3u of the positive electrolyte tank container 3.

As shown in FIGS. 12 and 13, the positive electrolyte outgoing pipe 31 extends from the inside of the positive electrolyte tank container 3 through the through-hole of the positive electrolyte tank container 3 toward the outside of the positive electrolyte tank container 3 and is connected to a connection structure 5. The positive electrolyte supply pipe 231 extends from the connection structure 5, passes through the through-hole of the battery container 2, and is led into the battery container 2. The positive electrolyte discharge pipe 232 extends from the battery container 2 through the through-hole of the battery container 2 toward the outside of the battery container 2 and is connected to a connection structure 5. The positive electrolyte return pipe 32 extends from the connection structure 5, passes through the through-hole of the positive electrolyte tank container 3, and is led into the positive electrolyte tank container 3. The arrangement positions of the connection structures 5 can be, as shown in FIG. 12, outside the end plate or side plate of the battery container 2 (outside the side plate or end plate of the positive electrolyte tank container 3), or can be, as shown in FIG. 13, outside the side plate or end plate of the battery container 2 and above the top plate of the top plate 3u of the positive electrolyte tank container 3.

(2) One of the connection structure 5 between the pipe 231 and the outgoing pipe 31 and the connection structure 5 between the pipe 232 and the return pipe 32 on the positive electrode side may be arranged inside one of the battery container 2 and the positive electrolyte tank container 3, and the other connection structure 5 may be arranged outside the three containers 2 to 4.

Figure 14:
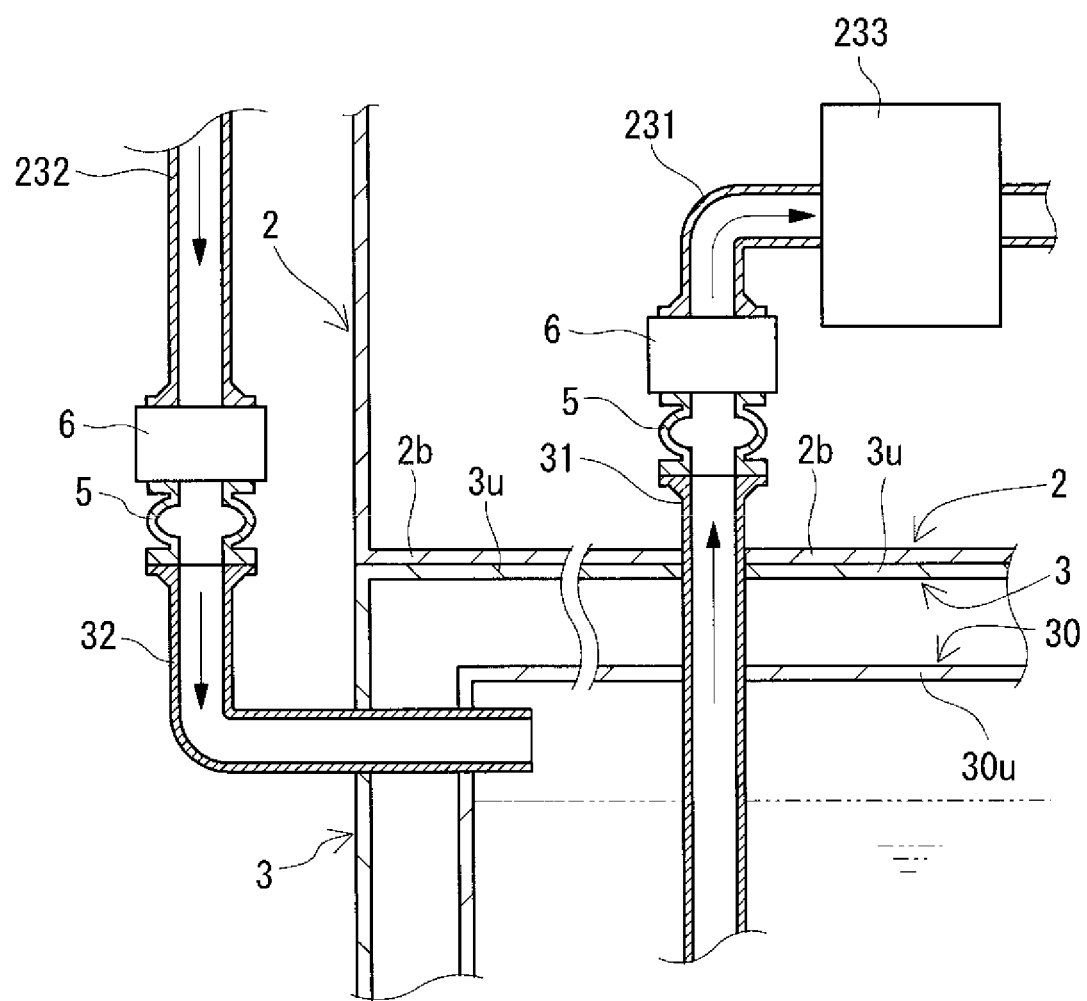
FIG. 14 is a partial sectional view schematically showing another example of arrangement positions of connection structures included in a redox flow battery according to a modification example.
Figure 15:
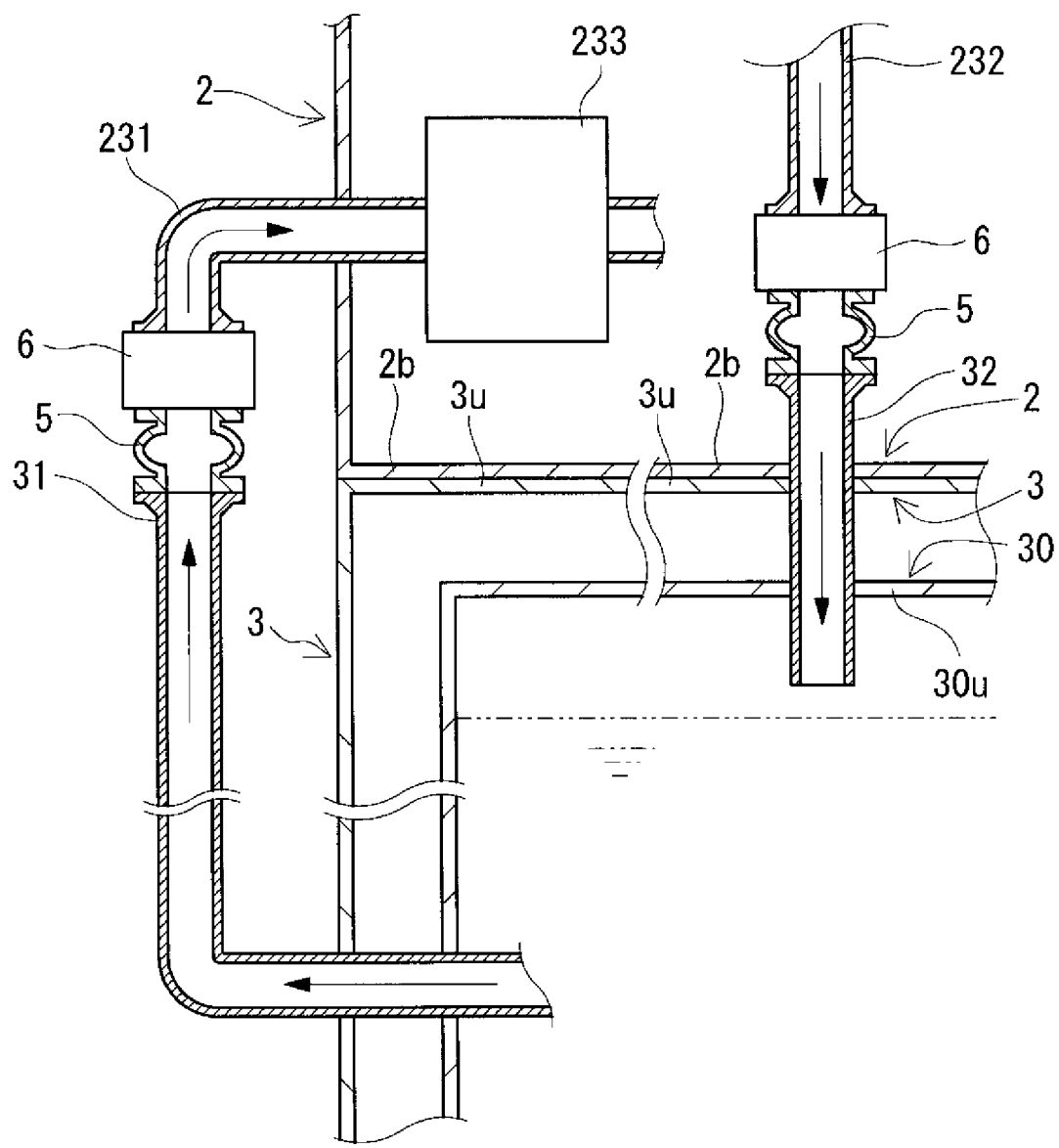
FIG. 15 is a partial sectional view schematically showing another example of arrangement positions of connection structures included in a redox flow battery according to a modification example.

One of the connection structures 5 may be arranged, for example, inside the battery container 2 as shown in FIGS. 14 and 15, or may be arranged inside the positive electrolyte tank container 3, although not shown. One of the connection structures 5 may be a connection structure 5 which connects the positive electrolyte supply pipe 231 to the positive electrolyte outgoing pipe 31 as shown in FIG. 14, or may be a connection structure 5 which connects the positive electrolyte discharge pipe 232 to the positive electrolyte return pipe 32 as shown in FIG. 15.

As shown in FIG. 14 (FIG. 15), through-holes for inserting the positive electrolyte outgoing pipe 31 (positive electrolyte return pipe 32) are formed in the bottom plate 2b of the battery container 2 and the top plate 3u of the positive electrolyte tank container 3. A through-hole for inserting the positive electrolyte discharge pipe 232 (positive electrolyte supply pipe 231) is formed in the end plate or side plate of the battery container 2. A through-hole for inserting the positive electrolyte return pipe 32 (positive electrolyte outgoing pipe 31) is formed in the side plate or end plate of the positive electrolyte tank container 3.

As shown in FIG. 14, the positive electrolyte outgoing pipe 31 and the positive electrolyte supply pipe 231 are as described in the embodiment with reference to FIG. 7. That is, the positive electrolyte outgoing pipe 31 extends from the inside of the positive electrolyte tank container 3, passes through the through-holes of the positive electrolyte tank container 3 and the battery container 2, is led into the battery container 2, and is connected to the connection structure 5. The positive electrolyte supply pipe 231 is connected to the connection structure 5 and arranged inside the battery container 2. The positive electrolyte discharge pipe 232 and the positive electrolyte return pipe 32 are as described above with reference to FIG. 12.

As shown in FIG. 15, the positive electrolyte outgoing pipe 31 and the positive electrolyte supply pipe 231 are as described above with reference to FIG. 12. On the other hand, the positive electrolyte discharge pipe 232 and the positive electrolyte return pipe 32 are as described in the embodiment with reference to FIG. 7. That is, the positive electrolyte discharge pipe 232 is arranged inside the battery container 2 and is connected to the connection structure 5. The positive electrolyte return pipe 32 extends from the connection structure 5, passes through the through-holes of the battery container 2 and the positive electrolyte tank container 3, and is led into the positive electrolyte tank container 3.

The arrangement position of the connection structure 5 between the positive electrolyte supply pipe 231 (positive electrolyte discharge pipe 232) and the positive electrolyte outgoing pipe 31 (positive electrolyte return pipe 32) can be inside the battery container 2 as shown in FIG. 14 (FIG. 15), and the arrangement position of the connection structure 5 between the positive electrolyte return pipe 32 (positive electrolyte outgoing pipe 31) and the positive electrolyte discharge pipe 232 (positive electrolyte supply pipe 231) can be outside the end plate or side plate of the battery container 2 (outside the side plate or end plate of the positive electrolyte tank container 3).

(3) Both the connection structure 5 between the pipe 231 and the outgoing pipe 31 and the connection structure 5 between the pipe 232 and the return pipe 32 on the positive electrode side may be arranged inside the positive electrolyte tank container 3, although not shown.

(4) One of the connection structure 5 between the pipe 231 and the outgoing pipe 31 and the connection structure 5 between the pipe 232 and the return pipe 32 on the positive electrode side may be arranged inside the battery container 2, and the other connection structure 5 may be arranged inside the positive electrolyte tank container 3, although not shown.

Calculation Example 1

The number of battery modules was set to be one for each calculation object. The contact area A among the containers, the total surface area Sb, and the surface area reduction rate Sc were calculated for each of the cross-stacking type, parallel-stacking type, and collinear-stacking type arrangements. Here, in each type, three containers were combined in seven patterns (P1 to P7) described below. The containers were stacked in two levels. Two tank containers were arranged on the lower side, and one battery container was placed on the upper side so as to extend over and between the two tank containers on the lower side, evenly on the roofs of the two tank containers. The total surface area Sb was determined from the formula "the total surface area Sa of the non-stacking type−the contact area A". The surface area reduction rate Sc (%) was determined by the formula "{1−(total surface area Sb)/(total surface area Sa)}×100". The calculation results thereof are shown in Table 1.

P1: Three containers are all 20 ft containers.
P2: Three containers are all 20 ft high cube containers.
P3: A battery container is a 20 ft container, and two tank containers are 40 ft containers.
P4: A battery container is a 20 ft high cube container, and two tank containers are 40 ft high cube containers.
P5: Three containers are all 40 ft containers.
P6: Three containers are all 40 ft high cube containers.
P7: A battery container is a 20 ft high cube container, and two tank containers are 45 ft high cube containers.

TABLE 1

| Arrangement | Calculation item | Combination of three containers | | | | | | |
| --- | --- | --- | --- | --- | --- | --- | --- | --- |
| | | P1 | P2 | P3 | P4 | P5 | P6 | P7 |
| Cross-stacking type | Contact area A ($mm^2$) | 11.9 | 11.9 | 11.9 | 11.9 | 11.9 | 11.9 | 11.9 |
| | Total surface area Sb ($mm^2$) | 196.9 | 212.5 | 320.3 | 343.3 | 382.0 | 408.8 | 375.9 |
| | Surface area reduction rate Sc (%) | 10.8 | 10.1 | 6.9 | 6.5 | 5.9 | 5.5 | 5.9 |

TABLE 1-continued

| Arrangement | Calculation item | Combination of three containers | | | | | | |
|---|---|---|---|---|---|---|---|---|
| | | P1 | P2 | P3 | P4 | P5 | P6 | P7 |
| Parallel-stacking type | Contact area A (mm$^2$) | 30.5 | 32.3 | 46.4 | 50.1 | 61.3 | 65.0 | 54.5 |
| | Total surface area Sb (mm$^2$) | 159.8 | 171.6 | 251.4 | 267.0 | 283.2 | 302.5 | 290.7 |
| | Surface area reduction rate Sc (%) | 27.6 | 27.4 | 26.9 | 27.3 | 30.2 | 30.1 | 27.3 |
| Collinear-stacking type | Contact area A (mm$^2$) | 21.1 | 21.8 | 21.1 | 21.8 | 36.0 | 36.8 | 21.8 |
| | Total surface area Sb (mm$^2$) | 178.5 | 192.6 | 301.9 | 323.5 | 333.7 | 359.0 | 356.0 |
| | Surface area reduction rate Sc (%) | 19.1 | 18.5 | 12.3 | 11.9 | 17.8 | 17.0 | 10.9 |
| Non-stacking type | Total surface area Sa (mm$^2$) | 220.7 | 236.2 | 344.1 | 367.1 | 405.8 | 432.6 | 399.6 |

As shown in Table 1, in each of the cross-stacking type, the parallel-stacking type, and the collinear-stacking type, even if the combination of the three containers is in any of the patterns P1 to P7, the contact area A is larger than the contact area of the non-stacking type. This is because the contact area of the non-stacking type is 0 (zero). Therefore, in each of the cross-stacking type, the parallel-stacking type, and the collinear-stacking type, even if the combination of the three containers is in any of the patterns P1 to P7, the total surface area Sb is smaller than the total surface area Sa of the non-stacking type. That is, the surface area reduction rate Sc of each of the cross-stacking type, the parallel-stacking type, and the collinear-stacking type can be increased, even if the combination of the three containers is in any of the patterns P1 to P7. Specifically, the surface area reduction rate Sc can be 5% or more. In particular, in the parallel-stacking type and the collinear-stacking type, the contact area A can be increased compared with the cross-stacking type, and therefore, the total surface area Sb can be decreased to increase the surface area reduction rate Sc.

Calculation Example 2

The number of battery modules was varied in the range of 2 to 20. The contact area A among the containers, the total surface area Sb, and the surface area reduction rate Sc were calculated for each of cross-stacking type, parallel-stacking type, and collinear-stacking type battery modules. Regarding the combination of three containers in each battery module, two patterns, i.e., patterns P2 and P4 in Calculation Example 1, were set for each type. The calculation results in the case where three containers were combined in pattern P2 in each battery module are shown in Table 2, and the calculation results in the case of P4 are shown in Table 3.

When cross-stacking type battery modules are used, the battery modules are arranged in the parallel direction of the tank containers. Specifically, the longitudinal directions of the battery containers are collinear with each other, and the end surfaces of the battery containers of the adjacent battery modules are in contact with each other over the substantially entire region. The side surfaces of the tank containers of the adjacent battery modules are in contact with each other over the substantially entire region.

When parallel-stacking type battery modules are used, the battery modules are arranged in the parallel direction of the tank containers. Specifically, the side surfaces of the tank containers of the adjacent battery modules are in contact with each other over the substantially entire region. The side surfaces of the battery containers of the adjacent battery modules face each other over the substantially entire region, but with a distance therebetween without being in contact with each other.

When collinear-stacking type battery modules are used, the battery modules are arranged in a direction orthogonal to both the series direction and the vertical direction of the tank containers. Specifically, the respective side surfaces of the three containers of the adjacent battery modules are in contact with each other over the substantially entire region.

TABLE 2

| | | Combination of three containers in each battery module P2 | | | | | |
|---|---|---|---|---|---|---|---|
| | | Number of battery modules | | | | | |
| Arrangement | Calculation item | 2 | 3 | 4 | 5 | 10 | 20 |
| Cross-stacking type | Contact area A (mm$^2$) | 48.4 | 84.9 | 121.4 | 157.9 | 340.3 | 705.2 |
| | Total surface area Sb (mm$^2$) | 375.7 | 539.0 | 702.2 | 865.5 | 1681.8 | 3314.4 |
| | Surface area reduction rate Sc (%) | 20.5 | 24.0 | 25.7 | 26.7 | 28.8 | 29.9 |
| Parallel-stacking type | Contact area A (mm$^2$) | 82.2 | 132.0 | 181.9 | 231.7 | 481.0 | 979.6 |
| | Total surface area Sb (mm$^2$) | 308.1 | 444.7 | 581.2 | 717.7 | 1400.4 | 2765.7 |
| | Surface area reduction rate Sc (%) | 34.8 | 37.3 | 38.5 | 39.2 | 40.7 | 41.5 |
| Collinear-stacking type | Contact area A (mm$^2$) | 96.3 | 170.8 | 245.2 | 319.7 | 692.0 | 1436.6 |
| | Total surface area Sb (mm$^2$) | 279.9 | 367.2 | 454.5 | 541.9 | 978.5 | 1851.7 |
| | Surface area reduction rate Sc (%) | 40.8 | 48.2 | 51.9 | 54.1 | 58.6 | 60.8 |
| Non-stacking type | Total surface area Sa (mm$^2$) | 472.5 | 708.7 | 945.0 | 1181.2 | 2362.4 | 4724.9 |

TABLE 3

| Arrangement | Calculation item | Combination of three containers in each battery module P4 Number of battery modules | | | | | |
|---|---|---|---|---|---|---|---|
| | | 2 | 3 | 4 | 5 | 10 | 20 |
| Cross-stacking type | Contact area A (mm$^2$) | 66.1 | 120.4 | 174.7 | 228.9 | 500.2 | 1042.8 |
| | Total surface area Sb (mm$^2$) | 601.9 | 860.6 | 1119.2 | 1377.8 | 2670.8 | 5256.8 |
| | Surface area reduction rate Sc (%) | 18.0 | 21.9 | 23.8 | 24.9 | 27.2 | 28.4 |
| Parallel-stacking type | Contact area A (mm$^2$) | 135.5 | 220.8 | 306.2 | 391.6 | 818.5 | 1672.4 |
| | Total surface area Sb (mm$^2$) | 463.3 | 659.7 | 856.0 | 1052.4 | 2034.1 | 3997.6 |
| | Surface area reduction rate Sc (%) | 36.9 | 40.1 | 41.7 | 42.7 | 44.6 | 45.6 |
| Collinear-stacking type | Contact area A (mm$^2$) | 131.8 | 241.8 | 351.8 | 461.8 | 1011.7 | 2111.6 |
| | Total surface area Sb (mm$^2$) | 470.6 | 617.7 | 764.9 | 912.0 | 1647.7 | 3119.1 |
| | Surface area reduction rate Sc (%) | 35.9 | 43.9 | 47.9 | 50.3 | 55.1 | 57.5 |
| Non-stacking type | Total surface area Sa (mm$^2$) | 734.2 | 1101.4 | 1468.5 | 1835.6 | 3671.2 | 7342.4 |

As shown in Tables 2 and 3, in each of the cross-stacking type, the parallel-stacking type, and the collinear-stacking type, even if the combination of the three containers in each battery module is in pattern P2 or P4, the contact area A is larger than the contact area (=0) of the non-stacking type, and increases as the number of battery modules increases. In each of the cross-stacking type, the parallel-stacking type, and the collinear-stacking type, even if the combination of the three containers in each battery module is in pattern P2 or P4, when compared for the same number of battery modules, the total surface area Sb is smaller than the total surface area Sa of the non-stacking type. In each of the cross-stacking type, the parallel-stacking type, and the collinear-stacking type, even if the combination of the three containers in each battery module is in pattern P2 or P4, the surface area reduction rate Sc is large. In particular, in the cross-stacking type, the parallel-stacking type, and the collinear-stacking type, the surface area reduction rate Sc increases as the number of battery modules is increased. As the number of battery modules is increased, the contact area A can be increased, the total surface area Sb can be decreased, and the surface area reduction rate Sc can be increased. Although depending on the stacking type and the number of battery modules, the surface area reduction rate Sc can be 50% or more.

The present invention is not limited to the examples described above, but the scope of the present invention is defined by the appended claims, and is intended to include all modifications within the meaning and scope equivalent to those of the claims.

The invention claimed is:

1. A redox flow battery comprising:
   a positive electrolyte tank container which houses a positive electrolyte tank for storing a positive electrolyte;
   a negative electrolyte tank container which houses a negative electrolyte tank for storing a negative electrolyte; and
   a battery container which houses a battery cell including a positive electrode, a negative electrode, and a membrane, a positive electrolyte circulation mechanism configured to supply and circulate the positive electrolyte to the battery cell, and a negative electrolyte circulation mechanism configured to supply and circulate the negative electrolyte to the battery cell,
   wherein the battery container is placed on the roof of the positive electrolyte tank container and the negative electrolyte tank container,
   wherein, when the redox flow battery is viewed from the top, a first short side of the battery container overlaps with an outer long side of the positive electrolyte tank container and a second short side of the battery container overlaps with an outer long side of the negative electrolyte tank container, and
   wherein long sides of the battery container are the same size or smaller than long sides of the positive electrolyte tank container and long sides of the negative electrolyte tank container, and
   wherein the short sides of the battery container are the same size or smaller than short sides of the positive electrolyte tank container and short sides of the negative electrolyte tank container.

2. The redox flow battery according to claim 1, wherein the positive electrolyte circulation mechanism includes a positive electrolyte supply pipe for supplying the positive electrolyte to the battery cell and a positive electrolyte discharge pipe for discharging the positive electrolyte from the battery cell, and the negative electrolyte circulation mechanism includes a negative electrolyte supply pipe for supplying the negative electrolyte to the battery cell and a negative electrolyte discharge pipe for discharging the negative electrolyte from the battery cell,
   wherein the positive electrolyte tank includes a positive electrolyte outgoing pipe for sending the positive electrolyte from the positive electrolyte tank to the positive electrolyte supply pipe and a positive electrolyte return pipe for returning the positive electrolyte from the positive electrolyte discharge pipe to the positive electrolyte tank, and the negative electrolyte tank includes a negative electrolyte outgoing pipe for sending the negative electrolyte from the negative electrolyte tank to the negative electrolyte supply pipe and a negative electrolyte return pipe for returning the negative electrolyte from the negative electrolyte discharge pipe to the negative electrolyte tank, and
   wherein the redox flow battery further comprises connection structures which connect, in a detachable manner, the positive electrolyte supply pipe, the negative electrolyte supply pipe, the positive electrolyte discharge pipe, and the negative electrolyte discharge pipe to the positive electrolyte outgoing pipe, the negative electrolyte outgoing pipe, the positive electrolyte return pipe, and the negative electrolyte return pipe, respectively.

3. The redox flow battery according to claim 1, wherein the battery container extends over and between the positive electrolyte tank container and the negative electrolyte tank container and is placed evenly on the roofs of the positive electrolyte tank container and the negative electrolyte tank container.

4. The redox flow battery according to claim 3, wherein the positive electrolyte tank container and the negative electrolyte tank container are arranged in parallel with a distance therebetween such that the longitudinal directions thereof are parallel to each other, and
the battery container is placed such that the longitudinal direction thereof is orthogonal to the longitudinal directions of the positive electrolyte tank container and the negative electrolyte tank container.

5. The redox flow battery according to claim 3, wherein the positive electrolyte tank container and the negative electrolyte tank container are arranged in parallel such that the longitudinal directions thereof are parallel to each other, and the side surfaces thereof are in contact with each other, and
the battery container is placed such that the longitudinal direction thereof is parallel to the longitudinal directions of the positive electrolyte tank container and the negative electrolyte tank container.

6. The redox flow battery according to claim 3, wherein the positive electrolyte circulation mechanism and the negative electrolyte circulation mechanism include a positive electrolyte pump and a negative electrolyte pump for circulating the positive electrolyte and the negative electrolyte, respectively, and
when the inside of the battery container is viewed from a long side of the battery container, the positive electrolyte pump and the negative electrolyte pump are arranged at positions that are symmetrical with respect to the center, in the longitudinal direction, of the battery container.

7. The redox flow battery according to claim 1, wherein, when the redox flow battery is viewed from the top, a long side of the battery container overlaps with a short side of the positive electrolyte tank container and a short side of the negative electrolyte tank container.

8. A redox flow battery comprising:
a positive electrolyte tank container which houses a positive electrolyte tank for storing a positive electrolyte;
a negative electrolyte tank container which houses a negative electrolyte tank for storing a negative electrolyte; and
a battery container which houses a battery cell including a positive electrode, a negative electrode, and a membrane, a positive electrolyte circulation mechanism configured to supply and circulate the positive electrolyte to the battery cell, and a negative electrolyte circulation mechanism configured to supply and circulate the negative electrolyte to the battery cell,
wherein the battery container is placed on the roof of the positive electrolyte tank container and the negative electrolyte tank container,
wherein, when the redox flow battery is viewed from the top, a first short side of the battery container overlaps with a first short side of the positive electrolyte tank container and a first short side of the negative electrolyte tank container,
wherein, when the redox flow battery is viewed from the top, a first long side of the battery container overlaps with the roof of the positive electrolyte tank container and a second long side of the battery container overlaps with the roof of the negative electrolyte tank container, and
wherein the long sides of the battery container are the same size or smaller than long sides of the positive electrolyte tank container and long sides of the negative electrolyte tank container, and
wherein short sides of the battery container are the same size or smaller than short sides of the positive electrolyte tank container and short sides of the negative electrolyte tank container.

9. The redox flow battery according to claim 8, wherein, when the redox flow battery is viewed from the top, a second short side of the battery container overlaps with a second short side of the positive electrolyte tank container and a second short side of the negative electrolyte tank container.

10. The redox flow battery according to claim 8, wherein, when the redox flow battery is viewed from the top, a second short side of the battery container overlaps with the roof of the positive electrolyte tank container and the roof of the negative electrolyte tank container.

11. A redox flow battery comprising:
a positive electrolyte tank container which houses a positive electrolyte tank for storing a positive electrolyte;
a negative electrolyte tank container which houses a negative electrolyte tank for storing a negative electrolyte; and
a battery container which houses a battery cell including a positive electrode, a negative electrode, and a membrane, a positive electrolyte circulation mechanism configured to supply and circulate the positive electrolyte to the battery cell, and a negative electrolyte circulation mechanism configured to supply and circulate the negative electrolyte to the battery cell,
wherein the battery container is placed on the roof of the positive electrolyte tank container and the negative electrolyte tank container,
wherein the positive electrolyte tank container and the negative electrolyte tank container are arranged in series such that the longitudinal directions thereof are parallel to each other,
wherein the battery container is placed such that the longitudinal direction of the battery container is collinear with the longitudinal directions of the positive electrolyte tank container and the negative electrolyte tank container, and
wherein long sides of the battery container are the same size or smaller than long sides of the positive electrolyte tank container and long sides of the negative electrolyte tank container, and
wherein short sides of the battery container are the same size or smaller than short sides of the positive electrolyte tank container and short sides of the negative electrolyte tank container.

12. The redox flow battery according to claim 11, wherein, when the redox flow battery is viewed from the top, a first long side of the battery container overlaps with a first long side of the positive electrolyte tank container and a first long side of the negative electrolyte tank container.

13. The redox flow battery according to claim 12, wherein, when the redox flow battery is viewed from the top, a second long side of the battery container overlaps with a second long side of the positive electrolyte tank container and a second long side of the negative electrolyte tank container.

* * * * *